United States Patent
Palys

(10) Patent No.: US 9,663,632 B2
(45) Date of Patent: May 30, 2017

(54) MODIFICATION OF POLYAMIDES

(71) Applicant: Arkema Inc., King of Prussia, PA (US)

(72) Inventor: Leonard H. Palys, Downingtown, PA (US)

(73) Assignee: Arkema Inc., King of Prussia, PA (US)

(*) Notice: Subject to any disclaimer, the term of this patent is extended or adjusted under 35 U.S.C. 154(b) by 0 days.

(21) Appl. No.: 15/033,935

(22) PCT Filed: Oct. 22, 2014

(86) PCT No.: PCT/US2014/061686
§ 371 (c)(1),
(2) Date: May 3, 2016

(87) PCT Pub. No.: WO2015/069455
PCT Pub. Date: May 14, 2015

(65) Prior Publication Data
US 2016/0272781 A1    Sep. 22, 2016

Related U.S. Application Data

(60) Provisional application No. 61/901,468, filed on Nov. 8, 2013.

(51) Int. Cl.
| C08L 77/00 | (2006.01) |
| C08K 5/14 | (2006.01) |
| C08L 77/02 | (2006.01) |
| C08L 77/06 | (2006.01) |
| C08G 69/48 | (2006.01) |
| C08K 5/13 | (2006.01) |
| C08K 5/3492 | (2006.01) |

(52) U.S. Cl.
CPC .............. C08K 5/14 (2013.01); C08G 69/48 (2013.01); C08K 5/13 (2013.01); C08K 5/34924 (2013.01); C08L 77/02 (2013.01); C08L 77/06 (2013.01)

(58) Field of Classification Search
None
See application file for complete search history.

(56) References Cited

U.S. PATENT DOCUMENTS

| 3,565,867 | A | 2/1971 | Hoyt et al. |
| 4,419,499 | A * | 12/1983 | Coran .................. C08G 18/86 525/403 |
| 4,619,962 | A | 10/1986 | Sato |
| 5,270,377 | A | 12/1993 | Otawa et al. |
| 6,689,851 | B1 | 2/2004 | Rowland et al. |
| 6,863,981 | B2 | 3/2005 | McBain |
| 7,915,336 | B2 | 3/2011 | Van Horn et al. |
| 2002/0025997 | A1 | 2/2002 | Yamaguchi et al. |
| 2003/0134979 | A1 | 7/2003 | Ferrari et al. |
| 2004/0118468 | A1 | 6/2004 | Mestemacher |
| 2006/0128894 | A1 | 6/2006 | Nasreddine et al. |
| 2006/0185750 | A1 | 8/2006 | Mestemacher |
| 2010/0081073 | A1 | 4/2010 | Otsubo et al. |
| 2012/0142887 | A1 | 6/2012 | Desbois et al. |
| 2012/0329928 | A1 | 12/2012 | Oriani |

* cited by examiner

Primary Examiner — Ana Woodward
(74) Attorney, Agent, or Firm — Lynn B. Morreale

(57) ABSTRACT

The present invention relates to an improved modified polyamide having increased molecular weight and substantially the same or marginally increased viscosity versus shear weight as the unmodified polyamide. A method for modifying polyamides to provide these improved properties also is disclosed wherein a polyamide having an initial molecular weight is contacted with at least one organic peroxide, at least one coagent and/or one free-radical trap to form an improved polyamide having an increased molecular weight and substantially the same viscosity versus shear rate. The present disclosure also relates to polyamide compositions comprising organic peroxides and articles made from the modified polyamide.

21 Claims, 8 Drawing Sheets

MODIFICATION OF POLYAMIDES

CROSS-REFERENCE TO RELATED APPLICATIONS

This application is a national stage application under 35 U.S.C. §371 of PCT/US2014/061686 filed Oct. 22, 2014, which claims benefit to U.S. patent application 61/901,468, filed Nov. 8, 2013.

FIELD OF THE INVENTION

The present invention relates to improved modified polyamides having increased molecular weight, improved melt strength, improved creep resistance, while maintaining substantially the same or marginally higher viscosity versus shear rate as unmodified polyamides and to methods of providing such improved modified thermoplastic polyamides.

The present invention also relates to the use of improved compositions having increased melt strength, comprising at least one polyamide, organic peroxide and optionally at least one coagent and/or free-radical trap. The improved compositions may be made into various fibers, films, foamed products, extruded products, or molded thermoplastic products.

The present invention also relates to articles made from the improved compositions wherein the improved compositions comprise sufficient amounts of organic peroxide such that the resulting compositions may be thermoset or cross-linked.

The present invention also relates to creation of improved polyamide resin products via extrusion, injection molding, compression molding, thermoforming, transfer molding and rotational molding operations.

BACKGROUND OF THE INVENTION

As one of the first commercially available synthetic thermoplastic polymers, polyamide resins have found widespread use in many applications. Polyamides, which include aramids, are commonly used in fabrics, pipes, and ballistic fibers. Polyamides include those sold under the brand names Rilsan® and Hiprolon® by Arkema, Inc.

In one application, polyamides are used make natural gas pipes for natural gas distribution and use. Pipes made with polyamides may have pressure limitations, identified as pressure ratings, when used as natural gas pipe. Higher internal pressures can deform, e.g., expand, and change diameter of the pipe, often to deleterious effect. This deformation is typically referred to as "creep" of the polymer. Increased creep resistance may be associated with an excessive increase in viscosity of the molten polyamide. Excessively higher viscosities are undesirable because they can make extruding polyamide articles more difficult and/or commercially impractical. In addition, through continued use such polyamide gas pipe may deform by increasing in diameter due to the pressure of the natural gas.

When molding polyamides, polyamide typically is dried to remove any water prior to melting and processing to prevent hydrolysis, which can result in chain scission and degradation, as well as loss of physical properties such as strength. Drying the polyamide increases cost in both time and energy.

Further information is described in U.S. publication No. 20120142887, U.S. publication No. 201001081073, U.S. publication No. 20040118468, U.S. publication No. 20060185750, U.S. Pat. No. 7,915,336, U.S. Pat. No. 6,863,981, U.S. Pat. No. 5,270,377, and U.S. Pat. No. 4,619,962.

Therefore, it is desirable to increase the strength of the polyamide to provide greater creep resistance, while still having good viscosity under extrusion conditions. A polyamide having greater creep resistance while maintaining an acceptable viscosity for extrusion can allow polyamide articles to be made via extrusion processes known in the art such as pipe, profiles, fibers, sheet, film and non-woven applications. This also applies to injection molding, compression molding, thermoforming, transfer molding and rotational molding operations.

It is desirable to develop methods of processing polyamides that can be performed without the added step of drying the polyamide before processing while avoiding hydrolysis of the polyamide or weakening of the polyamide article.

SUMMARY OF THE INVENTION

The present invention relates to methods of providing improved polyamides by modifying polyamides with an organic peroxide to provide curable thermoplastic or thermoset compositions. In at least one embodiment, the method comprises contacting a polyamide with at least one organic peroxide under conditions sufficient to increase the molecular weight of the polyamide while substantially maintaining the same viscosity versus shear rate as that of the unmodified polyamide (as used herein "unmodified polyamide" means polyamide that has not been in contact with at least one organic peroxide).

In another embodiment, the modified polyamide has a higher viscosity versus unmodified polyamide. This serves to improve melt strength, but the viscosity is not high enough to prevent polymer flow during processing to make pipe, profile or fiber or other articles.

In one embodiment the present invention relates to methods for providing improved modified polyamides comprising the steps of, (1) providing a first (or unmodified) polyamide having an initial molecular weight, (2) contacting said first polyamide with at least one organic peroxide under conditions sufficient to provide a second polyamide having increased the molecular weight and substantially the same or higher viscosity versus shear rate as the first polyamide. The contacting step may occur in the presence of one or more of (1) coagent, (2) free radical trap (3) peroxide-reactable polyolefin, and (4) rubber.

In one embodiment, the unmodified polyamide is used "as is", i.e., it is not subjected to drying prior to contact with organic peroxide.

In one embodiment, the unmodified polyamide is dried to a moisture level recommended by the resin supplier, prior to the modification taught herein. In one embodiment, the unmodified polyamide may be dried prior to the modification process, whereby the moisture content of the dried unmodified polyamide resin is less than 0.10% by weight, preferably less than 0.07%.

The present invention also relates to a composition comprising, consisting essentially of, or consisting of, at least one polyamide, at least one organic peroxide, and optionally at least one coagent and/or free radical trap. The polyamide may be a homopolymer, copolymer or mixture thereof, and crystalline or amorphous or a mixture thereof.

In one embodiment, in addition to organic peroxide, the composition comprises, consists essentially of, or consists of one or more polyamides selected from the group consisting of PA4, PA46, PA9, PA11, PA12, PA610, PA612, PA1010, PA1012 polyamides, including Rilsan® polyamides, Hiprolon® polyamides, (e.g., Hiprolon®70, Hiprolon®90, Hiprolon®200, Hiprolon®400, Hiprolon®11, Hiprolon®211), Pebax® polyether block polyamides and Platamid® copolyamide, all available from Arkema Inc., King of Prussia, Pa.

In one embodiment, in addition to polyamide, the composition comprises, consists essentially of, or consists of at least one peroxide selected from the group consisting of diacyl, peroxydicarbonate, endo, dialkyl, peroxyketal, peroxyester, monoperoxycarbonate, hydroperoxide, ketone peroxide and trioxepane peroxide.

In one embodiment, in addition to polyamide and organic peroxide, the composition comprises, consists essentially of, or consists of at least one crosslinking coagent selected from the group consisting of class 1, class 2 and hybrid coagents, including those available from Sartomer, Exton, Pa. Class 1 coagents include acrylic, methacrylic and bismaleimide type coagents. Class 2 coagents have at least one allylic group and/or aromatic group, preferably two allylics, and most preferably three allylic groups, including for example triallyl cyanurate or triallyl isocyanurate or blends thereof.

In one embodiment, the free radical trap is selected from the group consisting of hydroquinones and nitroxide free radicals.

In one embodiment, the composition is substantially free of peroxide-reactable polyolefin and/or rubber.

The invention also is directed to a polyamide article manufactured according to the methods described herein. In one embodiment, the improved polyamide is thermoplastic or thermoset.

The present invention further relates to methods of manufacturing polyamide articles. In accordance with one embodiment, a method of manufacturing a polyamide article comprises the steps of, (1) providing at least one polyamide and at least one peroxide, and/or a pre-blend of at least one polyamide and at least one peroxide and (2) applying heat to form a mixture of a molten polyamide and at least one organic peroxide, (3) molding the molten polyamide mixture, wherein molding is performed by a process selected from the group consisting of extrusion, injection molding, compression molding, transfer molding, and rotational molding, thereby forming a polyamide article which is substantially free of organic peroxide, wherein the polyamide in the molten state becomes modified by the decomposing peroxide.

In another embodiment, the invention is directed to a method for manufacturing of thermoplastic or thermoset polyamide articles, comprising the steps of:

(1) melting a polyamide to obtain a molten polyamide;

(2) mixing the molten polyamide with at least one organic peroxide, wherein the at least one organic peroxide is present in an amount of at least about 0.010 phr to 20.0 phr;

(3) molding the molten polyamide, wherein molding is performed by a process selected from the group consisting of: extrusion, injection molding, compression molding, thermoforming, transfer molding, and rotational molding.

The present invention also relates to methods for processing wet polyamides, methods for making polyamide pipe, and methods for grafting a polyamide.

The present invention also is directed to articles made by the methods described herein.

In one embodiment herein, the improved modified polyamides described herein have higher impact strength, increased tensile strength, and/or increased creep resistance than the unmodified polyamides, but substantially the same or higher viscosity versus shear rate as the unmodified polyamides. It has been unexpectedly discovered that modifying polyamides with the addition of organic peroxides provides polyamides having significantly improved strength (as demonstrated using the G' elastic shear modulus) while maintaining substantially the same or higher viscosity in Pascal-seconds versus shear rate as that of the unmodified (i.e., non-peroxide-containing) polyamides. Accordingly, improved polyamides of the present invention have improved flow properties with no substantial change in viscosity as compared to unmodified polyamides.

The improved modified polyamides of this invention have improved environmental stress crack resistance and abrasion resistance. Another advantage of the peroxide-modified polyamides is that they allow for the manufacture of reduced weight, lower density, foamed polyamide articles made using well known blowing agents. This is beneficial from a reduced raw material cost basis and also is environmentally desirable as it reduces land fill waste.

DETAILED DESCRIPTION OF THE INVENTION

Figure 1:
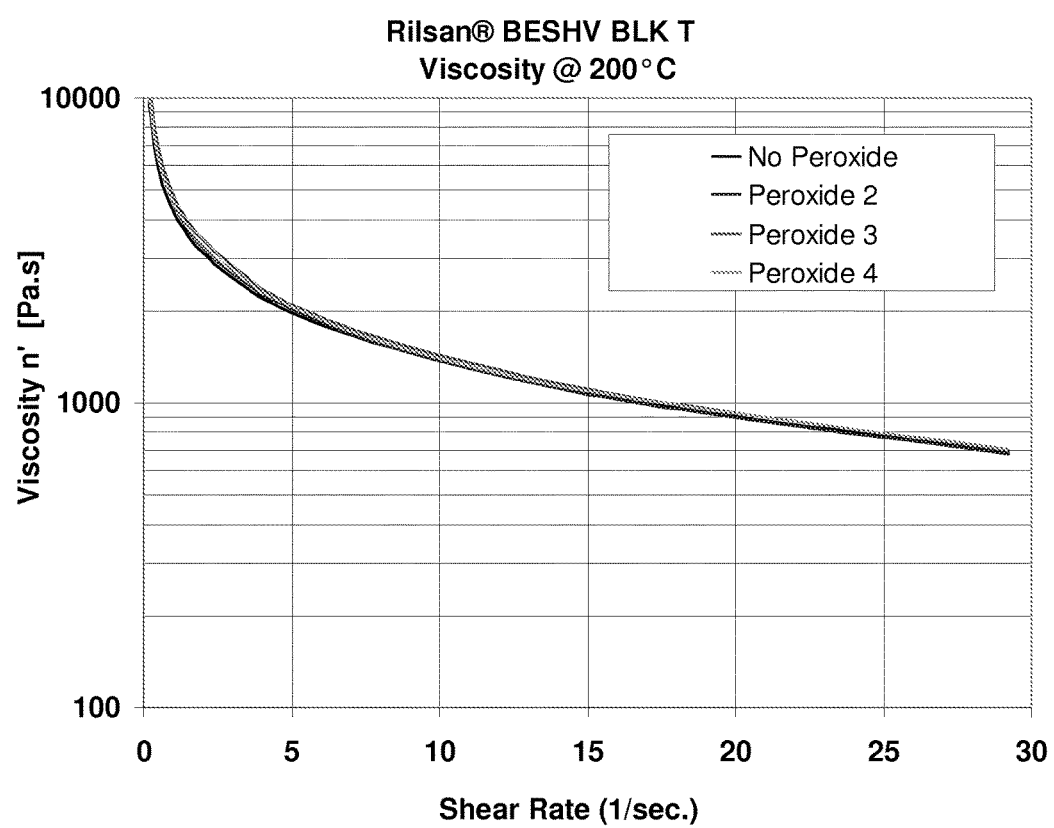
FIG. 1 is a graph of viscosity vs. frequency (or shear rate) as described in Example 1 according to certain embodiments of the present disclosure. It is a graph of polyamide (Rilsan® BESHV BLK T) Viscosity versus Shear Rate, comparing unmodified (no peroxide) and peroxide modified polyamide.

In one embodiment, the method for providing improved modified polyamides comprises the steps of, (1) providing a first (i.e., unmodified) polyamide having an initial molecular weight, (2) contacting said first polyamide with at least one organic peroxide under conditions sufficient to provide a second (i.e., modified) polyamide having increased the molecular weight and substantially the same or increased viscosity versus shear rate as the first polyamide. The contacting step may occur in the presence of one or more of the following: coagent, free radical trap, peroxide-reactable polyolefin, and rubber.

In one embodiment, the method for modifying the polyamide comprises crosslinking the polyamide using an organic peroxide formulation. The organic peroxide formulation comprises, consists essentially of, or consists of at least one organic peroxide, and optionally at least one coagent and/or free radical trap. In one embodiment, the method for modifying the polyamide resin comprises the step of combining an unmodified polyamide with an organic peroxide formulation at a temperature sufficient to decompose the peroxide in the resin, preferably for a minimum of 6 to 8 half lives and at a temperature sufficient to decompose the peroxide to levels of less than 3% peroxide, preferably less than 2% peroxide, preferably less than 1% peroxides, preferably less than 0.5% peroxide, preferably less than 0.3% peroxide, more preferably less than 0.1% peroxide, and most preferably 0% peroxide, based on the weight of the final, cured composition. As used herein, the phrase "substantially peroxide free" refers to 0.2% peroxide or less, based on the weight of the final, cured composition.

In one embodiment, the organic peroxide is pure, solid, and/or has a 10 hr half-life at a temperature equal to or greater than 80° C. In one embodiment, the organic peroxide is pure, liquid, and/or has a 10 hr half-life temperature at a temperature equal to or greater than 95° C.

In one embodiment, the organic peroxide is capable of generating at least one free radical possessing an energy greater than 90 kcal/mole, more preferably greater than 95 kcal/mole, most preferably free radical energies which are greater than 100 kcal/mole.

In one embodiment, the modification of the polyamide does not substantially increase the polymer viscosity vs. shear rate thereby maintaining processing abilities, such as, for example, maintaining the ability to extrude, injection, or compression mold the polyamide. This means that the viscosity of the improved polymer is within 0% to 100% of the unimproved polymer viscosity in Pascal-seconds over a $0.1$ sec.$^{-1}$ to $29$ sec.$^{-1}$ shear rate at 200° C., preferably within 0% to 75%, more preferably within 0% to 50%, even more preferably 0% to 35%, even more preferably 0% to 25%, even preferably 0% to 10%, most preferably 0% to 5% of the unimproved polymer viscosity in Pascal-seconds over a 0.1 sec.$^{-1}$ to 29 sec.$^{-1}$ shear rate at 200° C. Preferably, the modification of the polyamide increases the polymer viscosity vs. shear rate such that the modified polymer retains the ability to flow such that a finished article can be formed from it.

In one embodiment, the modification of the polyamide increases the polymer viscosity vs. shear rate thereby maintaining processing abilities, such as, for example, maintaining the ability to extrude, injection or compression mold the polyamide. This means that the viscosity of the improved polymer is within 0% to 10,000% of the unimproved polymer viscosity in Pascal-seconds over a 0.1 sec.$^{-1}$ to 29 sec.$^{-1}$ shear rate at 200° C., preferably within 0% to 1000%, more preferably within 0% to 500%, even more preferably 0% to 250%, even more preferably 0% to 100%, most preferably 0% to 50% of the unimproved polymer viscosity in Pascal-seconds over a 0.1 sec.$^{-1}$ to 29 sec.$^{-1}$ shear rate at 200° C. Preferably, the modification of the polyamide increases the polymer viscosity vs. shear rate such that the modified polymer retains the ability to flow such that a finished article can be formed from it.

As used herein, "crosslinking" refers to the partial or full creation of bonds between polyamide chains, and possibly coagents. Crosslinking may also increase chain entanglements between polyamide chains. For one embodiment of this invention, polyamide chains are not crosslinked with organic peroxides, such that organic peroxides do not comprise any portion of the final cured composition.

As used herein, "polyamide" includes polyamide polymers with recurring amide groups, including those that are commercially available. Polyamides used in accordance with the present invention may be homopolymers, copolymers, terpolymers, and/or grafted, including mixtures thereof, and may be crystalline, amorphous, or mixtures thereof.

Polyamides include aliphatic, semi-aromatic, aromatic, and/or aliphatic grafted polyamide polymers and/or copolymers and/or blends of these resins including but not limited to the following: PA4, PA6, PA66, PA46, PA9, PA11, PA12, PA610, PA612, PA1010, PA1012, PA6/66, PA66/610, PAmXD6, PA6I, Rilsan® polyamides, Hiprolon® polyamides, Pebax® polyether block polyamides, Platamid® copolyamides, Cristamid® copolyamides, further including but not limited to Hiprolon®70, Hiprolon®90, Hiprolon®200, Hiprolon®400, Hiprolon®11, Hiprolon®211 (all available from Arkema, Inc.). Suitable polyamides also include TERRYL brand polyamides available from Cathay Industrial Biotech, Shanghai, China (PA46, PA6, PA66, PA610, PA 512, PA612, PA514, PA1010, PA11, PA1012, PA 12, PA1212), ExcoPAXX® polyamides available from DSM, Singapore, Vestamide® polyamides available from Evonik, Germany, semi-aromatic polyamides (e.g., PA6T, poly(hexamethyleneterephthalamide), such as Trogamid® polyamides available from Evonik and Amodel® polyamides available from Solvay, Alpharetta, Ga.) or Vicnyl® polyamides including PA10T, PAST from Kingfa Sci. & Tech Co, China, and Nylon®, Zytel® RS and "PLS" product lines (e.g., RSLC, LC including glass reinforced and impact modified grades), Elvamide® multi-polymer polyamides, Minion®, Zytel® LCPA, Zytel® PLUS polyamides from DuPont, Wilmington, Del., and aromatic type polyamides (e.g., poly(paraphenyleneterephthalamide), such as, Kevlar® and Nomex® polyamides from DuPont, Teijinconex®, Twaron® and Technora® polyamides from Teijin, Netherlands and Japan, and Kermel® polyamides from Kermel, Swicofil AG, Switzerland), the "bio-polyamide" polyamides derived using YXY building block monomers such as 2,5-furandicarboxylic acid and/or 2,5-hydroxymethyl tetrahydrofuran monomers derived from sugars (e.g., 5-hydroxymethyl furfural) from Solvay/Avantium including bio-based polyamides from Rhodia/Avantium, the Technyl® copolyamides from Solvay/Rhodia e.g., Technyl® 66/6, the hot melt adhesives Vestamelt® polyamides from Evonik, H1001w polyamide from Shanghai Farsseing Hotmelt Adhesive Co., Lanxess Durathan® polyamides e.g., Durathan® C131F PA6/6I copolyamide, Priplast® modified coplyamide elastomers by Croda Coatings & Polymers, Rowalit® polyamides by Rowak AG, Nylonxx® and Nylonxp® polyamides from Shanghai Xinhao Chemical Co., Ultramid® polyamide grades from BASF, Griltex® copolyamides by EMS-Griltech, and Euremelt® copolyamides from Huntsman.

The organic peroxide formulations of this invention comprise, consist essentially of, or consist of at least one organic peroxide, or a blend of different organic peroxides.

In one embodiment, organic peroxide is present in a curable composition an amount ranging from about 0.01 phr (parts peroxide per 100 parts of polyamide resin) to 20 phr. In other embodiments, organic peroxide is present in an amount ranging from about 0.1 phr to 10 phr, more preferably, from about 0.1 phr to 5 phr.

According to one embodiment, the method of modifying the polyamide can render the polyamide a thermoset or a thermoplastic. The amount of organic peroxide needed to render the polyamide a thermoset or thermoplastic may vary depending on the composition of the polyamide and can be readily determined by one skilled in the art. Typically, a thermoset polyamide may result by adding higher concentrations of organic peroxide. For example, a thermoset polyamide may result when the organic peroxide is added in an amount greater than 1 phr. Alternatively, limiting the amount of organic peroxide can prevent a thermoset polyamide from forming.

Organic peroxides that may be used in accordance with one embodiment of the invention include diacyl peroxides, peroxyesters, trioxepanes, monoperoxycarbonates, peroxyketals, peroxydicarbonates, endoperoxides, and dialkyl peroxides. In one embodiment, organic peroxide is chosen from the group consisting of peroxyketals, monoperoxycarbonates, dialkyl peroxides, endoperoxides, and peroxyesters.

Examples of peroxyesters include, but are not limited to, di-tert-butyl diperoxyphthalate, di-tert-amyl diperoxyphthalate, tert-butyl peroxybenzoate, tert-amyl peroxybenzoate, 2,5-di(benzoylperoxy)-2,5-dimethylhexxane, tert-butyl peroxymaleate, tert-amyl peroxymaleate, tert-butyl peroxy-2-ethylhexanoate, tert-butyl peroxyisobutyrate, tert-amyl peroxyisobutyrate, di(tert-butylperoxy)fumarate, tert-butyl peroxy(2-ethylbutyrate), tert-butyl peroxy-2-ethylhexanoate, tert-amyl peroxy-2-ethylhexanoate, 2,5-di(2-ethylhexanooylperoxy)-2,5-dimethylhexane, t-butyl peroxy-3,5,5-trimethylhexanoate, t-amyl peroxy-3,5,5-trimethylhexanoate, 1,1-dimethyl-3-hydroxy-butylperoxy-2-ethylhexanoate, tert-butylperoxy-3-carboxypropionate, tert-amylperoxy-3-carboxypropionate, 3-hydroxy-1,1-dimethylbutyl-2-ethyl-peroxyhexanoate, t-butyl peracetate, t-amyl peracetate and combinations thereof.

Non-limiting examples of monoperoxycarbonates include OO-tert-butyl-O-(isopropyl) monoperoxycarbonate, OO-tert-amyl-O-(isopropyl) monoperoxycarbonate, OO-tert-butyl-O-(2-ethylhexyl) monoperoxycarbonate, OO-tert-amyl-O-(2-ethylhexyl) monoperoxycarbonate, polyether poly(OO-tert-butyl monoperoxycarbonate), OO-t-butyl-O-polycaprolactone monoperoxy carbonate, 2,5-dimethyl-2,5-bis(isopropoxycarbonyl-peroxy)hexane, 2,5-dimethyl-2,5-bis(isopropoxycarbonyl-peroxy)hexyne-3, and combinations thereof.

Non-limiting examples of peroxyketals include 1,1-di(tert-butylperoxy)-3,3,5-trimethylcyclohexane, 1-tert-amylperoxy-1-methoxy cyclohexane, 1-tert-butylperoxy-1-methoxy cyclohexane, 1,1-di(tert-butylperoxy)cyclohexane, 1,1-di(tert-amylperoxy)cyclohexane, n-butyl-4,4-di(tert-butylperoxy)valerate, 4,4-bis(tert-butylperoxy)valeric acid, ethyl-3,3-di(tert-amylperoxy)butanoate, ethyl-3,3-di(tert-butylperoxy)butanoate, ethyl-3,3-di(tert-butylperoxy)butyrate, 2,2-di(tert-butylperoxy)butane, 2,2-di(tert-amylperoxy)butane (Lup 520), 2,2-di(tert-butylperoxy)propane, 2,2-di(tert-amylperoxy)propane, 2,2-di(tert-butylperoxy)4-methylpentane, 2,2-bis(4,4-di[tert-amylperoxy]cyclohexyl) propane, and combinations thereof.

Examples of diacyl peroxides include, but are not limited to, didecanoyl peroxide, dilauroyl peroxide, dibenzoyl peroxide, di(methyl benzoyl) peroxide, 2,4-dichlorobenzoyl peroxide, and combinations thereof.

Non-limiting examples of dialkyl peroxides include dicumyl peroxide, isopropenylcumyl cumyl peroxide, isopropylcumyl cumyl peroxide, m/p-di-tert-butylperoxydiisopropylbenzene (a,a'-bis(tert-butylperoxy)diisopropylbenzene), tert-butylperoxyisopropylbenzene (tert-butyl cumyl peroxide), m-isopropylolcumyl t-butyl peroxide (tert-butyl 3-isopropylolcumylperoxide), tert-butyl-3-isopropenyl-cumyl peroxide (m-isopropenylcumyl tert-butyl peroxide), tert-butyl-4-isopropenylcumyl peroxide, tert-butyl-3-isopropylcumyl peroxide, m/p-acetylcumyl t-butyl peroxide, 2,4-diallyloxy-6-tert-butylperoxide-1,3,5-triazine, 3,3,5,7,7-pentamethyl-1,2,4-trioxepane (e.g., AKZO NOBEL TRIGONOX® 311), 3,6,9-triethyl-3,6,9-trimethyl-1,4,7-triperoxonane (e.g., AKZO NOBEL TRIGONOX® 301), di-tert-butyl peroxide, 2-methoxy-2-tert-butylperoxy propane, di-tert-amyl peroxide, 2,5-dimethyl-2,5-di(tert-butylperoxy)hexane, 2,5-dimethyl-2,5-di(tert-amylperoxy)hexane, 2,5-dimethyl-2,5-di(tert-butylperoxy)hexyne-3, 1,3-dimethyl-3-(t-butylperoxy)butyl N[1-{3-(1-methylethenyl)phenyl}1-methylethyl]carbamate, 4-(tert-amylperoxy)-4-methyl-2-pentanol, 4-(tert-butylperoxy)-4-methyl-2-pentanol, 3-(t-butylperoxy)-3-methyl-2-pentanone, 4-methyl-4(tert-butylperoxy)-2-pentanone (e.g., LUPEROX® 120), 1-methoxy-1-tert-butylperoxy cyclohexane, 2,4,6-tri(tert-butylperoxy)triazine, tert-butyl-1,1,3,3-tetramethylbutyl peroxide, 3-methyl-3(tert-butylperoxy)-2-butanol (e.g., LUPEROX® 240), 3-methyl-3(tert-amylperoxy)-2-butanol (e.g., LUPEROX® 540), and combinations thereof.

Examples of monomeric functionalized dialkyl-type peroxides include, but are not limited to, 1-(2-tert-butylperoxy-isopropyl)-3-isopropenylbenzene (also known as tert-butyl-3-isopropenylcumyl peroxide or m-isopropenylcumyl tert0butyl peroxide), 1-(2-tert-butylperoxyisopropyl)-4-isopropenylbenzene, 1-(2-tert-butylperoxyisopropyl)-3,4-diisopropenylbenzene, 1,3-di(tert-butylperoxy)diisopropylbenzene-5-isopropenyl, 1,4-di(tert-butylperoxy) diisopropylbenzene-2-isopropenyl, 1-(2-tert-amulperoxyisopropyl)-3-isopropenylbenzene, 1-(2-tert-amylperoxyisopropyl)-4-isopropenylbenzene, 1-(2-tert-amylperoxyisopropyl)-3,4-diisopropenylbenzene, 1,3-dimethyl-3(t-butylperoxy)butyl N[1{3(1-methylethenyl)phenyl}1-methylethyl]carbamate, 2,4-diallyloxy-6-tert-butylperoxide-1,3,5-triazine, and combinations thereof.

Examples of endoperoxides, which can be used with the above monomeric or double-bond-containing peroxides, include, but are not limited to, 3,3,5,7,7-pentamethyl-1,2,4-trioxepane (TRIGONOX® 311) and 3,6,9-triethyl-3,6,9-trimethyl-1,4,7-triperoxonane (TRIGONOX® 301).

In at least one embodiment, the organic peroxides selected from the dialkyl class of peroxides are chosen from the group consisting of m/p-di(t-butylperoxy)diisopropylbenzene, t-butyl cumyl peroxide, and combinations thereof.

According to one embodiment, organic peroxide contains at least one acid functional group. In one embodiment, the organic peroxide is unsaturated.

The organic peroxides that are most preferred are selected from the group consisting of: t-butylcumyl peroxide; 2,5-dimethyl-2,5-di(t-butylperoxy)hexane; m/p-di(t-butylperoxy)diisopropylbenzene, di-t-butylperoxide; 2,5-dimethyl-2,5-di(t-butylperoxy)hexyne-3; dicumyl peroxide; t-butylperoxybenzoate; 1,1-di(t-butylperoxy)-3,3,5-trimethyl cyclohexane; 1,1-di(t-butylperoxy) cyclohexane; n-butyl-4,4-di(t-butylperoxy)valerate; ethyl 3,3-di(t-butylperoxy)butyrate; t-butyl peroxyacetate; OO-t-butyl-O-2-ethylhexyl monoperoxycarbonate; OO-t-butyl-O-isopropyl monoperoxycarbonate; and polyether polyt-butylperoxycarbonate.

In one embodiment, in addition to organic peroxide, the "organic peroxide formulation" comprises, consists essentially of, consists of, at least one additional component chosen from coagents, free radical traps, and other additives. In one embodiment, in addition to organic peroxide, the organic peroxide formulation comprises, consists essentially of, consists of at least one coagent and at least one free radical trap.

In one embodiment, the organic peroxide formulation may additionally comprise a free radical trap. Examples of free radical traps that may be used in accordance with embodiments of the present disclosure include but are not limited to nitroxide living free radicals and hydroquinones.

Non-limiting examples of free radical traps include TEMPO free radicals (2,2,6,6-tetramethyl-1-piperidinyloxy free radicals), SG-1 free radicals (nitroxide, 1-(diethoxyphosphinyl)-2,2-dimethylpropyl 1,1-dimethylethyl free radicals), slow polymerizing monomers, alpha methyl styrene dimer, methoxyallylphenyl allylether (MAPAE), diethylhydroxyl amine (DEHA), quinone compounds, hindered phenol antioxidant type radical scavengers, and combinations thereof. The free radical traps may be used alone or in combination.

Nitroxide living free radicals may include, but are not limited to, SG-1 free radical, 4-OH TEMPO free radical, TEMPO free radicals, PROXYL free radicals (2,2,5,5-tetramethyl-1-pyrrolidinyloxy free radicals), and combinations thereof.

TEMPO free radicals and their derivatives may include, for example, 4-hydroxy TEMPO free radical (4-hydroxy-2,2,6,6-tetramethyl-1-piperidinyloxy free radical), TEMPO-polymer bound or PS-TEMPO free radicals, 4-(2-bromoacetamido)-TEMPO free radical, 4-(2-iodoacetamido)-TEMPO free radical, 4-acetamido-TEMPO free radical, 4-amino-TEMPO free radical, 4-carboxy-TEMPO free radical, 4-hydroxy-TEMPO benzoate free radical, 4-maleimido-TEMPO free radical, 4-methoxy-TEMPO free radical, 4-oxo-TEMPO free radical, 4-phosphonooxy-TEMPO hydrate free radical, and combinations thereof.

PROXYL free radicals and their derivatives may include, for example, 3-(2-iodoacetamido)-PROXYL free radical, 3-[2-(2-maleimidoethoxy)ethylcarbamoyl]-PROXYL free radical, 3-carbamoyl-PROXYL free radical, 3-cyano-PROXYL free radical, 3-maleimido-PROXYL free radical, 3-(2-bromo-acetoamido-methyl)-PROXYL free radical, 3-(2-(2-iodoacetamido)acetamido)-PROXYL free radical, 3-(2-isothiocyanato-ethyl-carbamoyl)-PROXYL free radical, 3-(3-(2-iodoacetamido)-propyl-carbamoyl)-PROXYL free radical, and combinations thereof.

Other nitroxide free radicals that may be used in accordance with one embodiment of the disclosure include, for example, 16-doxyl-stearic acid methyl ester free radical, 2,2,3,4,5,5-hexamethyl-3-imidazolinium-1-yloxy methyl sulfate free radical, 2,2,6,6-tetramethyl-4-(methylsulfonyloxy)-1-piperidinooxy free radical, 4-(1-hydroxy-1-methylethyl)2,2,5,5-tetramethyl-3-imidazolinium-1-yloxy free radical, 4-phenacylidene-2,2,5,5-tetramethylimidazolidazolidin-1-yloxy free radical, 4-phenyl-2,2,5,5-tetramethyl-3-imidazolin-1-yloxy free radical, 5-DOXYL-stearic acid free radical (2-(3-carboxypropyl)-4,4-dimethyl-2-tridecyl-3-oxazolidinyloxy free radical), methyl 5-DOXYL free radical (2-(4-methoxy-4-oxobutyl)-4,4-dimethyl-2-tridecyl-3-oxazolidinyloxy free radical), 1-hydroxy-2,2,4,6,6-pentamethyl-4-piperidinyl-3,5-di-tert-butyl-4-hydroxybenzoate free radical, 1-hydroxy-2,2,5,5-tetramethyl-2,5-dihydro-1H-pyrrole-3-carboxylic acid free radical, 4-[(1-hydroxy-2,2,6,6-tetramethyl-4-piperidinyl)oxalate free radical, tris(1-hydroxy-2,2,4,6,6-pentamethyl-4-piperidinyl) phosphoinetricarboxylate free radical, CYPMPO (2-(5,5-dimethyl-2-oxo-2-lamda-5-[1,3,2]dioxaphosphinan-2-yl)-2-methyl-3,4-dihydro-2Hpyrrole-1-oxide free radical, 5-(2,2-dimethyl-1,3-propoxy cyclophosphoryl)-5-methyl-1-pyrroline N-oxide free radical, and mixtures thereof.

Non-nitroxide types of living free radical compounds may also be used. Non-limiting examples of non-nitroxide type free radicals include 3-beta-doxyl-5-alpha-cholestane free radical, galvinoxyl free radical (also known as 2,6-di-tert-butyl-alpha-(3,5-di-tert-butyl-4-oxo-2,5-cyclohexadien-1-ylidene)-para-tolyloxy free radical), and mixtures thereof.

Exemplary radical scavengers may also include slow polymerizing monomers. As used herein, the phrase "slow polymerizing monomer" refers to a monomer that reacts at a slow rate as would be understood by one skilled in the art. Slow polymerizing monomers may include, for example, dibutyl maleate, allyl malonic ester, nonyl maleate ester, and diethyl fumarate.

Quinone-type free radical traps that may be used in accordance with embodiments of the present invention include, for example, quinone, hydroquinone, and phenol or catechol type of free radical traps. Non-limiting examples of quinone-type free radical traps include p-benzoquinone, hydroquinone (1,4-benzenediol or 1,4-dihydroxybenzene), hydroquinone monomethyl ether (4-hydroxyanisole, MEHQ, or 4-methoxyphenol), hydroquinone monomethyl ether, hydroquinone monophenyl ether, MTBHQ (mono-t-butyl hydroquinone), di-t-butyl hydroquinone, di-t-amyl hydroquinone, toluhydroquinone, p-benzoquinone, p-benzoquinone dioxime, 2,6-dichloro-1,4-benzoquinone, 2,3,5,6-tetramethyl-1,4-benzoquinone, 2,5-dichloro-3,6-dihydroxy-p-benzoquinone, methyl-p-benzoquinone, 6-anilinoquinoline-5,8-quinone, pyrroloquinoline quinone, 2-allyl-6-methoxybenzo-1,4-quinone, quinhydrone (hydroquinone:benzoquinone 1:1 complex), 2,5-bis(morpholinomethyl)hydroquinone, 2-phenylhydroquinone, 1,2,4-benzenetriol (hydroxyhydroquinone), 4-mercaptophenol, bromohydroquinone, chlorohydroquinone, pyrocatechol (1,2-benzenediol or 1,2-dihydroxybenzene or catechol), tert-butyl catechol, resorcinol (1,3-benzenediol), and combinations thereof.

Hindered phenol antioxidants may be used alone or in combination with other radical scavengers disclosed herein. Non-limiting examples of hindered phenol antioxidants include compounds containing aromatic compounds containing at least one tertiary butyl group attached to a ring carbon adjacent to a ring carbon to which a hydroxyl group is attached. Exemplary hindered phenol antioxidants include BHT (butylated hydroxytoluene), BHA (butylated hydroxyanisole), IRGANOX® 1010, a phenolic based antioxidant, IRGANOX® 1076, a monofunctional hindered phenolic, both of which are available from CIBA, and ETHANOX® 703 (2,6-di-tertiary-butyl-N,N-dimethylamino-p-cresol), an antioxidant available from Albermarle Corp.

Other free radical traps that may be used, include, for example, triethanol amine, various alcohols, amines (e.g., diethylhydroxyl amine), other hydroxyalkylamines, bioflavonoids, and unsaturated molecules possessing very easily extractable hydrogens (e.g., allylic hydrogens and tertiary hydrogens, such as methoxyallylphenyl allylether, alpha methyl styrene, alpha methyl styrene dimer, dibutyl maleate, allyl malonic ester, various mono-allylic compounds, nonyl maleate ester, and diethyl fumarate). Examples of bioflavonoids include, for example, naringenin or tocopherols, which are also known as tocotrienols. Tocopherols are a class of chemical compounds where many have vitamin E activity. Tocopherols are considered generally regarded as safe, and include natural oils, such as clove oil.

According to at least one embodiment, the free radical trap is a hydroquinone, such as mono-tert-butyl hydroquinone.

In one embodiment, the organic peroxide formulation additionally comprises at least one coagent. As used herein, the phrase "coagent" refers to a compound containing one or more sites of unsaturation per molecule, which are capable of participating in a free radical reaction. Non limiting examples of coagents that may be used in accordance with embodiments of the present disclosure include coagents of the acrylic, methacrylic, allylic, vinyl, norbornene, bismaleimide, and polybutadiene types, such as those sold commercially by Sartomer and Cray Valley.

In at least one embodiment, the coagent is a class 2, or type II, coagent comprising at least one allylic functionality and/or aromatic functionality, and mixtures thereof. Class 2 coagents are well known in the art.

Non-limiting examples of mono and/or polyunsaturated coagents that may be used include alpha-methylstyrene dimer (e.g., NOFMER® MSD), various triallyl and triallyl functional compounds including triallyl cyanurate (2,4,6-tris-(2-propenyloxy)-1,3,5-triazine), triallyl isocyanurate, triallyl trimellitate, trimethyloylpropane triallyl ether, trimethyloylpropane diallyl ether, pentaerythritol triallyl ether, 1,3,5-triallyl-1,3,5-triazinane-2,4,6-trione, triallyl trimesate (1,3,5-benzenetricarboxylate), diallylmaleate, diallyl phthalate, diallyl isophthalate, allyl methacrylate, dimethacrylate, diacrylate, trimethacrylate and triacrylate compounds (e.g., trimethyloylpropane trimethacrylate or trimethyloylpropane triacrylate), N,N'-phenylene bismaleimide, di(isopropenyl) benzene, divinyl benzene, zinc diacrylate, and diallyl ether.

Other examples of coagents that may be used include the following compounds available from Sartomer: Saret® SR500, Saret® SR515, Saret® 516, Saret® 516, Saret® 516HP, Saret® SR517, Saret® SR517HP, Saret® SR517HPD, Saret® SR519HP, Saret® SR519HPD, Saret® SR521, Saret® SR521HP, Saret® SR522D, SR507A triallyl cyanurate, SR523 dual functional methacrylate crosslinking coagent, SR533 triallyl isocyanurate, CN790 acrylated adhesion promoter, CD401 cyclohexane dimethanol dimethacrylate, CD406 cyclohexane dimethanol diacrylate, CD421A 3,3,5-trimethylcyclohexyl methacrylate, CD535 dicyclopentadienyl methacrylate, CD542 ethoxylated (8) bisphenol a dimethacrylate, CD545 diethylene glycol methyl ether methacrylate, CD552 methoxy polyethylene glycol (550) monomethacrylate, CD553 methoxy polyethylene glycol (550) monoacrylate, CD560 alkoxylated hexanediol diacrylate, CD561 alkoxylated hexanediol diacrylate, CD563 alkoxylated hexanediol diacrylate, CD564 alkoxylated hexanediol diacrylate, CD590 aromatic acrylate monomer, CD591 acrylate ester, CD595 acrylate ester, CD612 ethoxylated (4) nonyl phenol methacrylate, CD613 ethoxylated nonyl phenol acrylate, CD730 triethylene glycol ethyl ether methacrylate, CD802 alkoxylated diacrylate, CD9021 highly propoxylated (5.5) glyceryl triacrylate, CD9043 alkoxylated neopentyl glycol diacrylate, CD9051 trifunctional acid ester, CD9054 trifunctional acid ester, CD9055 acidic acrylate adhesion promoter, CD9075 alkoxylated lauryl acrylate, CD9088 alkoxylated phenol acrylate, CN2603 epoxy acrylate oligomer, CN9021 acrylic esters, M-Cure EP201 epoxy resin/acrylate monomer blend, M-Cure EP211 epoxy resin/acrylate monomer blend, M-Cure EP300 epoxy resin/acrylate monomer blend, M-Cure EP310 epoxy resin/acrylate monomer blend, M-Cure EP400 epoxy resin/acrylate monomer blend, M-Cure EP40 epoxy resin/acrylate monomer blend, MCURE 100 aromatic acrylate modifier for epoxy/amine systems, MCURE 200 aromatic acrylate modifier for epoxy/amine systems, MCURE 201 aliphatic acrylate modifier for epoxy/amine systems, MCURE 202 aliphatic acrylate modifier for epoxy/amine systems, MCURE 203 aromatic urethane acrylate modifier for epoxy/amine systems, MCURE 300 aliphatic acrylate modifier for epoxy/amine systems, MCURE 400 aliphatic acrylate modifier for epoxy/amine systems, PRO11315 propoxylated neopentyl glycol diacrylate, SR101 ethoxylated bisphenol A dimethacrylate, SR150 ethoxylated bisphenol A dimethacrylate, SR203 tetrahydrofurfuryl methacrylate, SR205 triethylene glycol dimethacrylate, SR206 ethylene glycol dimethacrylate, SR209 tetraethylene glycol dimethacrylate, SR210 polyethylene glycol dimethacrylate, SR210A polyethylene glycol dimethacrylate, SR212B 1,3-butylene glycol diacrylate, SR213 1,3-butanediol diacrylate, SR214 1,4-butanediol dimethacrylate, SR214A 1,4-butanediol dimethacrylate, SR217 cycloaliphatic acrylate monomer, SR230 diethylene glycol diacrylate, SR231 diethylene glycol dimethacrylate, SR238 1,6-hexanediol diacrylate, SR238B 1,6-hexanediol diacrylate, SR239 1,6-hexane dimethacrylate, SR242 isodecyl methacrylate, SR247 neopentyl glycol diacrylate, SR248 neopentyl glycol dimethacrylate, SR252 polyethylene glycol (600) dimethacrylate, SR256 2-(2-ethoxyethoxy)ethyl acrylate, SR257 stearyl acrylate, SR259 polyethylene glycol (200) diacrylate, SR262 1,12 dodecanediol dimethacrylate, SR268 tetraethylene glycol diacrylate, SR272 triethylene glycol diacrylate, SR278 acrylate ester, SR285 tetrahydrofurfuryl acrylate, SR295 pentaerythritol tetraacrylate, SR297 1,3-butylene glycol dimethacrylate, SR297A 1,3-butylene glycol dimethacrylate, SR306 tripropylene glycol diacrylate, SR306F tripropylene glycol diacrylate, SR306HP tripropylene glycol diacrylate, SR313A lauryl acrylate, SR339 2-phenoxyethyl methacrylate, SR240 2-phenoxyethyl acrylate, SR340 2-phenoxyethyl methacrylate, SR344 polyethylene glycol (400) diacrylate, SR348 ethoxylated (2) bisphenol A dimethacrylate, SR349 ethoxylated (3) bisphenol A diacrylate, SR350 trimethylolpropane trimethacrylate, SR351 trimethylolpropane triacrylate, SR351H trimethyloylpropane triacrylate, SR351HP trimethyloylpropane triacrylate, SR351LV low viscosity trimethyloylpropane triacrylate, SR355 di-trimethylolpropane tetraacrylate, SR368 tris(2-hydroxyethyl) isocyanurate triacrylate, SR368D tris (2-hydroxy ethyl) isocyanurate triacrylate, SR395 isodecyl acrylate, SR399 dipentaerythritol pentaacrylate, SR399LV low viscosity dipentaerythritol pentaacrylate, SR415 ethoxylated (20) trimethylolpropane triacrylate, SR420 acrylic monomer, SR423A isobornyl methacrylate, SR440 isooctyl acrylate, SR444 pentaerythritol triacrylate, SR454 ethoxylated (3) trimethylolpropane triacrylate, SR454HP ethoxylated (3) trimethylolpropane triacrylate, SR480 ethoxylated (10) bisphenol dimethacrylate, SR484 octyldecyl acrylate, SR489D tridecyl acrylate, SR492 propoxylated (3) trimethylolpropane triacrylate, SR493D tridecyl methacrylate, SR494 ethoxylated (4) pentaerythritol tetraacrylate, SR495B caprolactone acrylate, SR499 ethoxylated (6) trimethylolpropane triacrylate, SR501 propoxylated (6) trimethylolpropane triacrylate, SR502 ethoxylated (9) trimethylolpropane triacrylate, SR504 ethoxylated (4) nonyl phenol acrylate, SR506A isobornyl acrylate, SR508 dipropylene glycol diacrylate, SR508IJ dipropylene glycol diacrylate, SR531 cyclic trimethylolpropane formal acrylate, SR534 acrylic ester, SR534D acrylic ester, SR540 ethoxylated (4) bisphenol A dimethacrylate, SR541 ethoxylated (6) bisphenol a dimethacrylate, SR550 methoxy polyethylene glycol (350)

monomethacrylate, SR551 methoxy polyethylene glycol (350) monoacrylate, SR562 alkoxylated hexanediol diacrylate, SR585 acrylic ester, SR586 acrylic ester, SR587 acrylic ester, SR588 acrylate ester, SR601 ethoxylated (4) bisphenol a diacrylate, SR602 ethoxylated (10) bisphenol a diacrylate, SR603 polyethylene glycol (400) dimethacrylate, SR606A polyester diacrylate, SR610 polyethylene glycol (600) diacrylate, SR611 alkoxylated tetrahydrofurfuryl acrylate, SR614 alkoxylated nonylphenol acrylate, SR644 polypropylene glycol (400) dimethacrylate, SR740A polyethylene glycol dimethacrylate water solution, SR833 S tricyclodecane dimethanol diacrylate, SR9003B propoxylated (2) neopentyl glycol diacrylate, SR9009 trifunctional methacrylate ester, SR9011 trifunctional methacrylate ester, SR9012 trifunctional acrylate ester, SR9020 propoxylated (3) glyceryl triacrylate, SR9020HP propoxylated (3) glyceryl triacrylate, SR9035 ethoxylated (15) trimethylolpropane triacrylate, SR9036A ethoxylated (30) bisphenol A dimethacrylate, SR9038 ethoxylated (30) bisphenol A diacrylate, SR9041 pentaacrylate ester, SR9045 alkoxylated neopentyl glycol diacrylate, SR9050 monofunctional acid ester, SR9053 trifunctional acid ester, SR9087 alkoxylated phenol acrylate, SR9209A alkoxylated aliphatic diacrylate, CN UVE 150/80 epoxy acrylate blended with 20% tripropylene glycol diacrylate, CN UVE 151 epoxy acrylate, CN104A60 epoxy acrylate blended with SR306, CN104A75 epoxy acrylate blended with SR306, CN104A80Z epoxy acrylate blended with SR306, CN104B80 epoxy acrylate blended with SR238, CN104D80 epoxy acrylate blended with SR9020, CN104Z epoxy acrylate, CN110 epoxy acrylate oligomer, CN110A80 epoxy acrylate blended with SR306, CN111 US epoxidized soy bean oil acrylate, CN112C60 epoxy novolak acrylate blended with SR351, CN113D70 acrylic oligomer/monomer blend, CN116 modified epoxy acrylate, CN117 modified epoxy acrylate, CN118 modified epoxy acrylate, CN119 modified epoxy acrylate, CN120A75 epoxy acrylate blended with SR-306, CN120A80 epoxy acrylate blended with SR306, CN120B80 epoxy acrylate blended with SR238, CN120060 epoxy acrylate blended with SR-351, CN120080 epoxy acrylate blended with SR351, CN120D80 epoxy acrylate blended with SR9020, CN120Z epoxy acrylate oligomer, CN121 low viscosity epoxy acrylate, CN131 low viscosity aromatic monoacrylate, CN131B low viscosity acrylic oligomer, CN132 low viscosity diacrylate oligomer, CN133 low viscosity triacrylate oligomer, CN136 modified epoxy acrylate, CN146 acrylic oligomer, CN147 acidic acrylate oligomer, CN152 low viscosity monoacrylate oligomer, CN153 epoxy acrylate oligomer, CN154 epoxy methacrylate, CN160 acrylated linseed oil oligomer, CN1963 urethane methacrylate, CN2003B modified epoxy acrylate oligomer, CN2102E epoxy acrylate, CN2200 polyester acrylate oligomer, CN2201 chlorinated polyester acrylate oligomer, CN2203 polyester acrylate oligomer, CN2207 polyester acrylate oligomer, CN2255 polyester acrylate oligomer, CN2256 polyester acrylate oligomer, CN2260 polyester acrylate oligomer, CN2261 polyester acrylate oligomer, CN2261LV polyester acrylate oligomer, CN2262 polyester acrylate, CN2264 polyester acrylate oligomer, CN2267 polyester acrylate oligomer, CN2270 polyester acrylate oligomer, CN2271E polyester acrylate oligomer, CN2273 polyester acrylate oligomer, CN2279 polyester acrylate, CN2281 polyester acrylate oligomer, CN2282 polyester acrylate oligomer, CN2283 polyester acrylate, CN2285 acrylic oligomer, CN2295 polyester acrylate oligomer, CN2298 acrylated polyester oligomer, CN2302 polyester acrylate oligomer, CN2303 polyester acrylate oligomer, CN2304 polyester acrylate oligomer, CN2601 brominated aromatic acrylate oligomer, CN2602 epoxy acrylate oligomer, CN292 polyester acrylate, CN2920 aliphatic urethane acrylate oligomer, CN2921 urethane acrylate blend, CN293 acrylated polyester oligomer, CN2930 acrylate oligomer, CN294E acrylated polyester oligomer, CN296 polyester acrylate, CN299 acrylated polyester oligomer, CN301 polybutadiene dimethacrylate, CN303 polybutadiene dimethacrylate, CN307 hydrophobic acrylate ester, CN308 hydrophobic acrylate ester, CN309 hydrophobic acrylate ester, CN310 hydrophobic aliphatic urethane acrylate, CN3100 low viscosity oligomer, CN3105 low viscosity oligomer, CN3108 specialty oligomer/monomer blend, CN3211 aliphatic urethane acrylate oligomer, CN3216 acrylate stabilizing additive, CN4001 acrylate oligomer, CN4002 fluorinated acrylate oligomer, CN4003 fluorinated acrylate oligomer, CN501 amine modified polyether acrylate oligomer, CN549 acrylic oligomer, CN550 amine modified polyether acrylate oligomer, CN551 amine modified polyether acrylate oligomer, CN704 acrylated polyester adhesion promoter, CN736 chlorinated polyester acrylate oligomer, CN738 chlorinated polyester acrylate oligomer, CN750 chlorinated polyester, CN820 acrylic oligomer, CN821 acrylic oligomer, CN822 acrylic oligomer, CN823 acrylic oligomer, CN9001 aliphatic urethane acrylate oligomer, CN9002 aliphatic urethane acrylate, CN9004 aliphatic urethane acrylate, CN9005 aliphatic urethane acrylate, CN9006 aliphatic urethane acrylate, CN9007 aliphatic urethane acrylate, CN9008 urethane acrylate oligomer, CN9009 aliphatic urethane acrylate oligomer, CN9010 aliphatic urethane acrylate oligomer, CN9011 aliphatic urethane oligomer, CN9013 urethane acrylate oligomer, CN9014 hydrophobic aliphatic urethane acrylate, CN9018 urethane acrylate oligomer, CN9019 urethane acrylate blend, CN9022 urethane acrylate ester, CN9024 urethane acrylate oligomer, CN9025 urethane acrylate, CN9026 urethane acrylate, CN9027 aromatic urethane acrylate oligomer, CN9028 aliphatic urethane acrylate, CN9029 urethane acrylate oligomer, CN902j75 brominated urethane acrylate oligomer, CN9030 urethane acrylate oligomer, CN9031 urethane acrylate oligomer, CN9039 urethane acrylate oligomer, CN9060 urethane acrylate oligomer, CN9061 urethane acrylate oligomer blend, CN9062 dual cure urethane acrylate oligomer, CN9101 aliphatic allyl oligomer, CN9102 aliphatic allyl urethane, CN9165US acrylate ester, CN9167US aromatic urethane acrylate, CN9178 aliphatic urethane acrylate, CN929 trifunctional urethane acrylate, CN9290US aliphatic urethane acrylate, CN944B85 urethane acrylate (blended with SR238), CN945A70 trifunctional urethane acrylate blended with SR306, CN959 aliphatic urethane diacrylate oligomer with acrylate monomer diluent, CN961H81 urethane acrylate blended with SR256, CN962 urethane acrylate, CN963A80 urethane acrylate blended with SR306, CN963B80 urethane acrylate blended with SR238, CN963E75 urethane acrylate blended with SR-454, CN963E80 urethane acrylate blended with SR454, CN963J85 urethane acrylate blended with SR506, CN964 urethane acrylate, CN964A85 urethane acrylate blended with SR306, CN965 urethane acrylate, CN966B85 urethane acrylate oligomer/monomer blend, CN966H90 urethane acrylate blended with SR256, CN966J75 urethane acrylate blended with SR506, CN968 urethane acrylate, CN969 aliphatic urethane acrylate, CN970A60 urethane acrylate blended with SR306, CN970E60 urethane acrylate blended with SR454, CN971A80 urethane acrylate blended with SR306, CN971J75 urethane acrylate/acrylic ester blend, CN972 urethane acrylate, CN973A80 urethane acrylate blended with SR306, CN973H85 urethane acrylate blended with SR256, CN973J75 urethane acrylate blended with SR506, CN975 hexafunctional urethane acrylate, CN977C70 urethane acrylate blended with SR351, CN978 urethane acrylate, CN9782 aromatic urethane acrylate, CN9783 aromatic urethane acrylate, CN9788 aliphatic urethane acrylate, CN980 urethane acrylate, CN9800 aliphatic silicone acrylate, CN981 urethane acrylate, CN981B88 urethane acrylate blended with SR-238, CN982A75 urethane acrylate blended with SR306, CN982B88 urethane acrylate blended with SR238, CN983 urethane acrylate, CN985B88 urethane acrylate blended with SR-238, CN986 aliphatic urethane acrylate, CN989 aliphatic urethane acrylate, CN9890 melamine acrylate, CN9893 aliphatic urethane acrylate, CN990 siliconized urethane acrylate oligomer, CN991 urethane acrylate, CN992 aromatic urethane acrylate, CN996 aliphatic urethane acrylate, CN997 aromatic urethane acrylate oligomer, CN999 aromatic urethane acrylate, Sarbox SB400 aromatic acid methacrylate half ester in PM alcohol solvent, Sarbox SB401 aromatic acid methacrylate half ester in EEP ester solvent, Sarbox SB402 aromatic acid methacrylate half ester in PM alcohol/EEP ester solvents, Sarbox SB405 aromatic acid acrylate half ester in pm acetate solvent, Sarbox SB500E50 aromatic acid methacrylate half ester in SR-454, Sarbox SB510E35 aromatic acid methacrylate half ester in SR454, Sarbox SB510M35 aromatic acid methacrylate half ester in SR339, Sarbox SB520A20 aromatic acid acrylate half ester in SR306, Sarbox SB520E35 aromatic acid acrylate half ester in SR454, Sarbox SB520M35 aromatic acid acrylate half ester in SR339, Sarcryl CN816 Sarcryl® functional acrylic oligomer, Sarmet® CN2400 metallic acrylate, Sarmet® CN2401 metallic acrylate, Sarmet® CN2402 metallic acrylate, Sarmet® CN2403 metallic acrylate.

In one embodiment the coagent is chosen from the group consisting of allyl type coagents, such as, for example, triallyl cyanurate, triallyl isocyanurate, and mixtures thereof.

Additives that may be used in accordance with the present invention include, for example, anti-static additives and fillers, as well as other additives known in the art. Conductive fillers may be added reduce static electricity build-up. Examples of conductive fillers include, but are not limited to, carbon black, metals, and conducting polymers. In at least one embodiment, the conductive filler may be chosen from silver and carbon black.

Reinforcing fillers may also be used. Reinforcing fillers may include, for example, nanotubes, fibers (e.g., glass fibers), and other fillers known in the art.

The type and amount of additives that may be used in the polyamide compositions of the present invention depend on the application for which the polyamide is used. Such determinations are known to those skilled in the art.

Antioxidants, light stabilizers and UV absorbers known in the art to protect polymers may also be used in accordance with the present invention. One type of antioxidant that may be used to protect the polyamide includes hindered phenol antioxidants. Light stabilizers may include, for example, hindered amine light stabilizers (HALS).

Other embodiments of the present disclosure relate to methods of grafting a polyamide by contacting a molten polyamide with an organic peroxide formulation as described above. When using coagents, there may be unexpected grafting of several polyamide chains linked together via use of an organic peroxide and a crosslinking coagent with or without the use of a small amount of a free-radical trap.

In at least one embodiment of the present disclosure, a method for manufacturing a polyamide article comprises heating a blend of at least one polyamide and at least one organic peroxide to form a molten mixture of the at least one polyamide and at least one organic peroxide, and molding the molten polyamide mixture, wherein the molding is performed by extrusion, injection molding, compression molding, transfer molding, or rotational molding, thereby forming a polyamide article that is substantially free, or free, of organic peroxide.

The methods of the present disclosure may be used to process wet or dry polyamides. For example, wet polyamide pellets may be melted without drying or conditioning the pellets to obtain a molten polyamide, which can be contacted with an organic peroxide formulation as described above.

At least one embodiment of the present disclosure relates to a method of manufacturing polyamide pipe. Molten polyamide, in the presence of an organic peroxide formulation, may be extruded to form a pipe. The pipe may comprise improved creep resistance as compared to a pipe formed without contacting the molten polyamide with an organic peroxide formulation.

Another embodiment is directed to a modified polyamide composition comprising 20 to 35 mesh powdered polyamide and: (i) at least one peroxide, or (iii) at least one peroxide and at least one coagent, or (iii) at least one peroxide, at least one coagent and at least one free-radical trap. This composition can be added to a rotomolding mold. The mold contains a molded crosslinked polyethylene article. The process comprises adding an unmodified polyamide composition plus an organic peroxide formulation to the mold containing the polyethylene article, returning the assembly to the oven, and rotomolding the assembly at suitable time-temperature profile. During rotomolding, the polyamide portion of the composition of the invention coats and binds to the interior of the polyethylene lined article while the peroxide decomposes. Using this method, a modified polyamide inner layer/coating is obtained on the polyethylene article that provides improved impact strength and adhesion of the polyamide to the polyethylene layer, thus overcoming disadvantages of the prior art, including poor adhesion of the polyamide inner layer to the PE outer layer, layer separation and poor impact strength of the finished fuel tank.

Depending upon the amount of peroxide formulation used and the type of polyamide used, a thermoplastic or thermoset inner layer of polyamide can be produced which becomes bonded to an outer polyethylene layer, thereby eliminating layer separation which would be detrimental for a gasoline fuel tank, as the polyamide inner layer serves as a barrier to gasoline migration into the atmosphere.

The curable polyamides which are modified with an organic peroxide formulation can be used in a variety of applications, including for example, fibers, extruded sheets, and foamed articles.

Examples of applications further include pipes, gas tubing, carpeting, shoes including inner and/or outer shoe soles, auto parts including gaskets, gears, and tubing, any molded part useful in electronics and small or large household appliances, rotomolded fuel tanks and other articles including airplane parts and interior panels, portions of wind powered turbines, solar panel back sheets, molded or extruded connectors, or any other molded or extruded device or profiles.

In one embodiment a method for making a thermoset polyamide is provided, said method comprising the step of pre-blending polyamide powder or micropellets with an organic peroxide formulation comprising a dialkyl peroxide, crosslinking coagent having either allylic or acrylic functional groups, and a free radical trap. The pre-blended composition is then placed into a heated mold at a temperature sufficient to melt the polyamide and for a time sufficient to result in decomposition of at least 6 half-lives of the peroxide.

In one embodiment a method for making improved polyamides is provided, said method comprising the steps of, (1) providing a polyamide and (2) reacting said polyamide with at least one organic peroxide formulation under conditions to produce a second polyamide with a higher Mw/Mn (polydispersity) and a higher Mz (Z-average polymer molecular weight) as measured by size exclusion chromatography. This second polyamide will also have a higher shear modulus as measured by a moving die rheometer or dynamic mechanical analysis.

In one embodiment an improved polyamide is provided by contacting a polyamide with an organic peroxide formulation to form a peroxide-modified polyamide, wherein the peroxide-modified polyamide provides a measurably higher shear modulus and lower tangent delta after the peroxide modification process compared to the unmodified polyamide as measured using a moving die Rheometer or by dynamic mechanical analysis.

The examples and embodiments described herein are exemplary only and are not intended to limit the scope of the invention. Modifications and substitutions may be made without departing the scope of the invention.

EXAMPLES

Example 1

In this example, undried (i.e., "wet") PA11 resin samples were modified at 200° C. with several organic peroxide formulations at conditions sufficient to decompose the peroxide formulations in the resin, thus modifying said polyamide. For these examples, the peroxides were decomposed to a minimum of 10 half lives. Once the organic peroxides have decomposed to a minimum of 10 half lives, the modified resins (which were also organic-peroxide-free) were studied at 200° C. to determine whether the elastic shear modulus (G') in kPa and the creep resistance (G"/G')=tangent delta, was improved. Despite using "wet" PA 11, these two physical properties were unexpectedly improved compared to control resins that were not modified/contacted with any organic peroxide formulation.

Using an Alpha Technologies RPA® 2000 dynamic mechanical instrument, several unmodified and modified polyamide compositions were evaluated at 200° C. containing 1 wt. % organic peroxide (1 weight percent of organic peroxide based on polyamide weight) with "wet PA11", that is, without pre-drying the PA11. With the RPA® 2000 instrument it is possible to conduct multiple tests in seriatim, including various dynamic rheological evaluations. For example, this instrument can conduct the analysis in a fashion that complies with the ASTM D5289 to determine shear modulus versus time temperature profile, D6601 to determine viscosity versus shear rate, and D7605 to test unmodified polyamide polymer viscosity.

ASTM D5289-12 (Standard Test Method for Rubber Property—Vulcanization Using Rotorless Cure Meters) was used to measure the increase in shear modulus in dN-m versus time in minutes at a constant temperature when the various peroxide formulations were tested.

ASTM D6601-12 (Standard Test Method for Rubber Properties—Measurement of Cure and After Cure Dynamic Properties Using a Rotorless Shear Rheometer) was used to measure the increase in shear modulus in dN-m versus time in minutes at a constant temperature and then after the polymer modification was completed, to study the effect of the final polymer's viscosity versus shear rate.

ASTM D7605-11 (Standard Test Method for Thermoplastic Elastomers-Measurement of Polymer Melt Rheological Properties and Congealed Dynamic Properties Using Rotorless Shear Rheometers) was used to test polymer viscosity prior to peroxide modification.

A Size Exclusion Chromatography method was used to measure Mz (or "Z average molecular weight") as described in Example 5 herein. Mv (or "Viscosity Average Molecular Weight") was determined using ASTM D2857-95(2007) Standard Practice for Dilute Solution Viscosity of Polymers, and ASTM D 789-07 Standard Test Methods for Determination of Solution Viscosities of Polyamide (PA). These methods use the "Mark Houwink" Equation $[n]=K(Mv)^a$.

In summary, modifying polyamide 11 (Rilsan® grade of PA11) with several organic peroxide formulations unexpectedly increased the elastic shear modulus, G' in kPa. The elastic shear modulus is proportional to increased polymer molecular weight. Therefore the higher the shear modulus is, the higher the polymer molecular weight. The elastic shear modulus G' (kPa) also is proportional to the Young's Modulus or tensile modulus, so the stiffness of the polyamide was increased by the peroxide modification. The data is provided in the Tables I, II, and III below.

"No peroxide" is the performance of the polyamide 11 control polymer without any organic peroxide modification. Peroxide 2, Peroxide 3, and Peroxide 4 were all incorporated into the polyamide 11 polymer at a use level of 1 phr (parts per hundred resin). The peroxide compositions are described below:

Peroxide 2

37.4 wt. % m/p-di(t-butylperoxy)diisopropyl benzene at >97% assay 2.6 wt. % mono-t-butyl hydroquinone 60.0 wt. % triallyl cyanurate Peroxide 3

37.4 wt. % tertiary-butylcumyl peroxide at >95% assay 2.6 wt. % mono-t-butyl hydroquinone 60.0 wt. % triallyl cyanurate Peroxide 4

100 wt. % tertiary-butylcumyl peroxide at >95% assay

TABLE I

Polamide Viscosity vs Shear Rate

| | Shear Rate | | | |
|---|---|---|---|---|
| Rad/sec | No Peroxide N' (Pa · sec) | Peroxide 2 n' (Pa · sec) | Peroxide 3 n' (Pa · sec) | Peroxide 4 n' (Pa · sec) |
| 1.05 | 10783 | 11551 | 12885 | 11417 |
| 1.89 | 8003 | 8447 | 9397 | 8598 |
| 3.4 | 5991 | 6417 | 6961 | 6478 |
| 6.12 | 4536 | 4860 | 5188 | 4860 |
| 11.03 | 3491 | 3658 | 3889 | 3712 |
| 19.88 | 2677 | 2764 | 2927 | 2798 |
| 35.81 | 1979 | 2032 | 2107 | 2064 |
| 64.52 | 1455 | 1455 | 1528 | 1486 |
| 116.25 | 1023 | 1018 | 1052 | 1048 |
| 209.44 | 685 | 681 | 696 | 702 |

TABLE II

Polyamide Shear Modulus (G'kPa) vs Frequency (or Shear Rate)

| | Shear Rate | | | |
|---|---|---|---|---|
| Rad/sec | No Peroxide G' (kPa) | Peroxide 2 G' (kPa) | Peroxide 3 G' (kPa) | Peroxide 4 G' (kPa) |
| 1.05 | 8.41 | 12.66 | 15.83 | 11.35 |
| 1.89 | 10.33 | 15.39 | 18.87 | 14.08 |
| 3.4 | 14.13 | 19.71 | 23.5 | 18.51 |
| 6.12 | 19.38 | 25.69 | 31.21 | 24.82 |
| 11.03 | 27.42 | 34.74 | 40.82 | 34.12 |
| 19.88 | 39.13 | 48 | 55.04 | 47.79 |
| 35.81 | 56.45 | 67.35 | 75.15 | 66.98 |
| 64.52 | 82.43 | 93.22 | 103.37 | 95.03 |
| 116.25 | 117.23 | 129.97 | 142.15 | 131.45 |
| 209.44 | 166.03 | 180.55 | 194.39 | 183.03 |

TABLE III

Polyamide Tangent Delta vs Shear Rate

| | Shear Rate | | | |
|---|---|---|---|---|
| Rad/sec | No Peroxide tan delta | Peroxide 2 Tan delta | Peroxide 3 tan delta | Peroxide 4 tan delta |
| 1.05 | 1.343 | 0.955 | 0.852 | 1.053 |
| 1.89 | 1.46 | 1.035 | 0.939 | 1.151 |
| 3.4 | 1.443 | 1.108 | 1.008 | 1.191 |
| 6.12 | 1.434 | 1.159 | 1.018 | 1.2 |
| 11.03 | 1.406 | 1.162 | 1.052 | 1.201 |
| 19.88 | 1.36 | 1.145 | 1.057 | 1.164 |
| 35.81 | 1.256 | 1.081 | 1.004 | 1.104 |
| 64.52 | 1.139 | 1.007 | 0.954 | 1.009 |
| 116.25 | 1.014 | 0.911 | 0.86 | 0.927 |
| 209.44 | 0.864 | 0.76 | 0.75 | 0.804 |

High tan delta (called damping factor) for polymers means high vibration control and also more polymer flow with less elasticity. More polymer flow also means more creep of the polymer. For better creep resistance, a lower tangent delta is preferred. As a result tangent delta (G"/G') versus frequency helps to differentiate the physical performance differences of polymers.

Unmodified polyamide with high tan delta at low shear (frequency) means higher polymer flow or creep deformation in the finished part (pipe) compared to peroxide modified polyamide.

Polyamide reacted with Peroxide 3 provided the best creep resistance of those peroxide modified compositions tested above. Tangent delta is also influenced by polymer molecular weight (indicative of higher molecular weight formation) when testing at higher frequencies rad/sec (shear rates). Lower tangent delta at high shear means higher molecular weight, more resistance to flow and/or higher molecular weight distribution. The better "low creep" response of polyamide modified by Peroxide 3 was thus due to the modified polymer's higher molecular weight or molecular weight distribution based on the low tangent delta obtained at the higher frequency. Polyamide modified by Peroxide 3 also had the highest G' (kPa) stiffness.

FIG. 1 refers to the data in TABLE I wherein a graph of the viscosity versus shear rate for unmodified and peroxide modified polyamide is provided.

Figure 2:
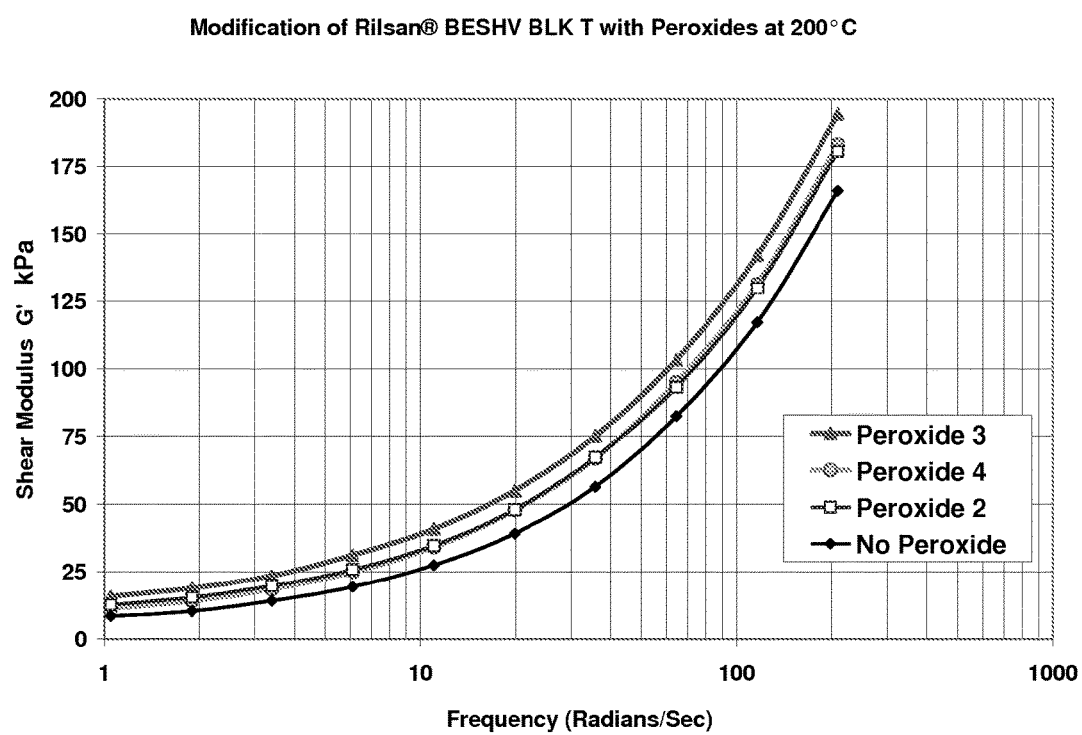
FIG. 2 is a graph of the shear modulus vs. frequency as described in Example 1 according to certain embodiments of the present disclosure. It is a graph of polyamide (Rilsan® BESHV BLK T) Shear Modulus in kPa versus Frequency (Shear Rate), where unmodified (no peroxide) and peroxide modified polyamide are compared.

FIG. 2 refers to the data in TABLE II wherein a graph of polyamide shear modulus versus frequency (shear rate) is provided.

Figure 3:
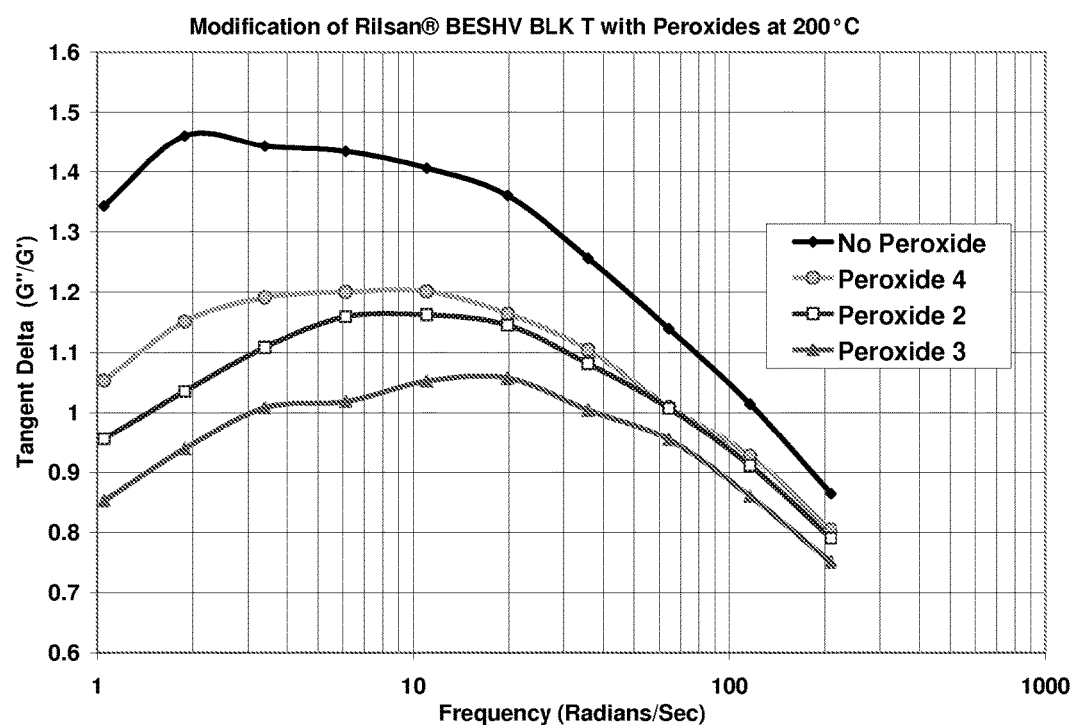
FIG. 3 is a graph of tangent delta vs. frequency as described in Example 1 according to certain embodiments of the present disclosure. It is a graph of polyamide (Rilsan® BESHV BLK T) Tangent Delta (G"/G') versus Frequency (Shear Rate), where unmodified (no peroxide) and peroxide modified polyamide are compared.

FIG. 3 refers to the data in TABLE III wherein a graph of polyamide tangent delta versus shear rate is provided.

Example 2

To prepare samples for extrusion, Rilsan® BESNO (PA 11) pellets were placed in glass jars to which the peroxides formulations, Peroxide E2-1 and Peroxide E2-2, were weighed and placed into separate individual glass jars at the concentration of 0.05 wt %. The glass jars were sealed with an aluminum foil lined lid and were shaken to uniformly distribute the organic peroxide formulations. The organic peroxide coated Rilsan® BESNO pellets were allowed to sit for at least 24 hours, prior to extrusion.

A 16 mm co-rotating twin screw extruder was used to modify Rilsan® BESNO (a polyamide 11) with various peroxide formulations. This example demonstrates that it is possible to use low levels of peroxide and still provide effective polyamide modification. The peroxide formulations were used at 0.05 wt % concentration which is equivalent to 500 ppm (parts per million). The BESNO polyamide was first dried under applied vacuum using a vacuum oven for a minimum of four hours at a temperature greater than or equal to 80° C. to less than or equal to 90° C. prior to extrusion to attain a maximum moisture content less than or equal to 0.08% maximum moisture content. The dried polyamide pellets were removed from the oven, cooled in a sealed container. The dried Rilsan® BESNO polyamide pellets were then blended with peroxide and immediately run on the twin screw extruder with the conditions provided below.

| | |
|---|---|
| Screw speed (rpm) | 18 |
| Zone 1 (° C.) | 240 |
| Zone 2 (° C.) | 245 |
| Zone 3 (° C.) | 245 |
| Zone 4 (° C.) | 250 |
| Zone 5 (° C.) | 250 |
| Zone 6 (° C.) | 250 |
| Zone 7 (° C.) | 245 |
| Zone 8 (° C.) | 245 |
| Zone 9 (° C.) | 240 |
| Die (° C.) | 230 |
| Feed Rate (lbs/hr) | 1.0 |

The resulting extruded polyamide polymers were then tested on a RPA Rheometer to measure the physical properties of: Shear Modulus, Tangent Delta and Viscosity using the appropriate ASTM methods described in Example 1. Two different peroxide formulations (Peroxide E2-1 and Peroxide E2-2) were evaluated at the 0.05 wt % concentration.

Peroxide E2-1
37.4 wt. % tertiary-butylcumyl peroxide at >95% assay
2.6 wt. % mono-t-butyl hydroquinone
60.0 wt. % triallyl cyanurate Peroxide E2-2
97.4 wt. % tertiary-butylcumyl peroxide at >95% assay
2.6 wt. % mono-t-butyl hydroquinone The extruder conditions were selected to properly and completely decompose the peroxide in the extruder so that only peroxide-free extruded polyamide remained. To serve as a control, the dried Rilsan polyamide polymer was run through the extruder without peroxide (unmodified polyamide) and was labeled "Neat Rilsan—Extruded" on FIG. 4, FIG. 5 and FIG. 6.

Figure 4:
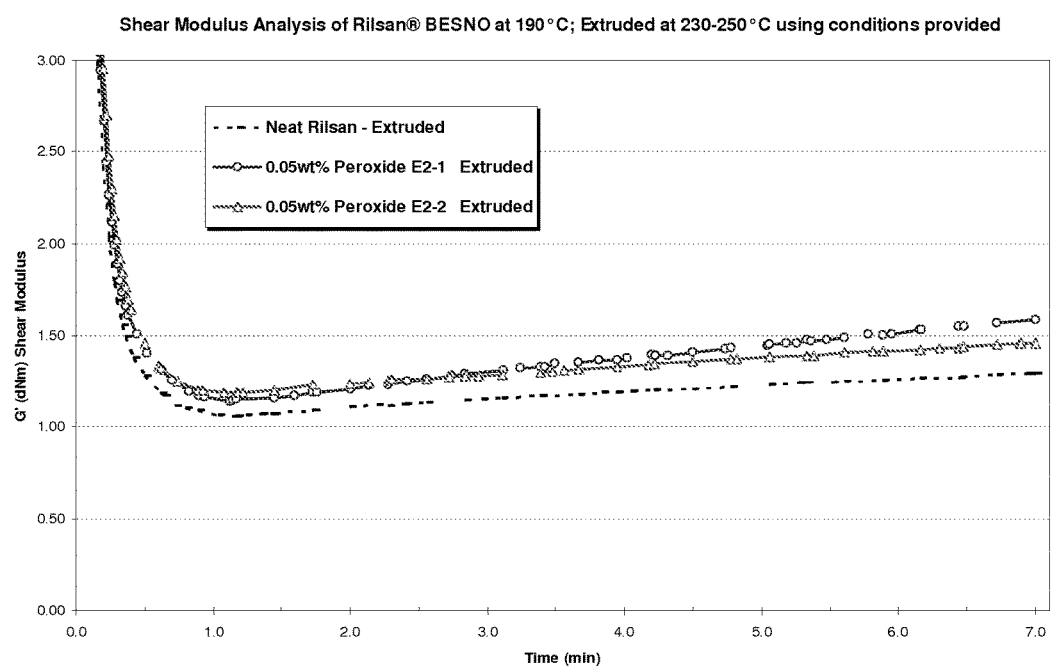
FIG. 4 is a graph of shear modulus vs. time of polyamide 11 at 190° C. after modification of the polyamide in a twin screw extruder as described in Example 2.

FIG. 4 shows that it is possible to increase the shear modulus of the polyamide after only using 0.05 wt % of a peroxide formulation. The shear modulus was determined at 190° C. at a 1° arc of strain and a frequency of 100 cycles/minute using an Alpha Technologies RPA instrument.

Higher shear modulus is desirable as it is proportional to tensile modulus which indicates increased polymer strength both in the melt and in the solid state. This data indicates increased the polymer melt strength when using organic peroxides, compared to the Neat Rilsan Extruded when no peroxide modification was employed. Increased polymer melt strength is beneficial for fiber and film manufacturing operations.

Figure 5:
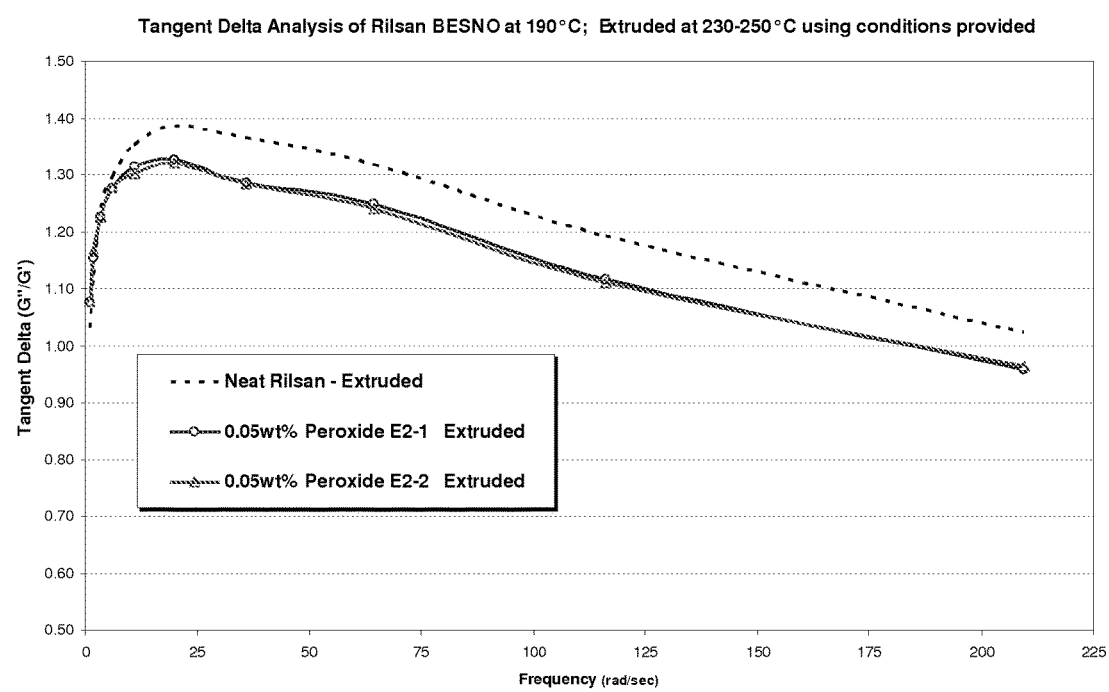
FIG. 5 is a graph of tangent delta vs. frequency of polyamide 11 at 190° C. after modification of the polyamide in a twin screw extruder as described in Example 2.

FIG. 5 shows that it is possible to decrease the tangent delta of the polyamide after only using 0.05 wt % of a peroxide formulation. Lower tangent delta is desirable as it signifies a polymer with improved creep resistance. A polymer with improved creep resistance will have a less tendency to deform when an applied force such as weight or pressure is applied.

Figure 6:
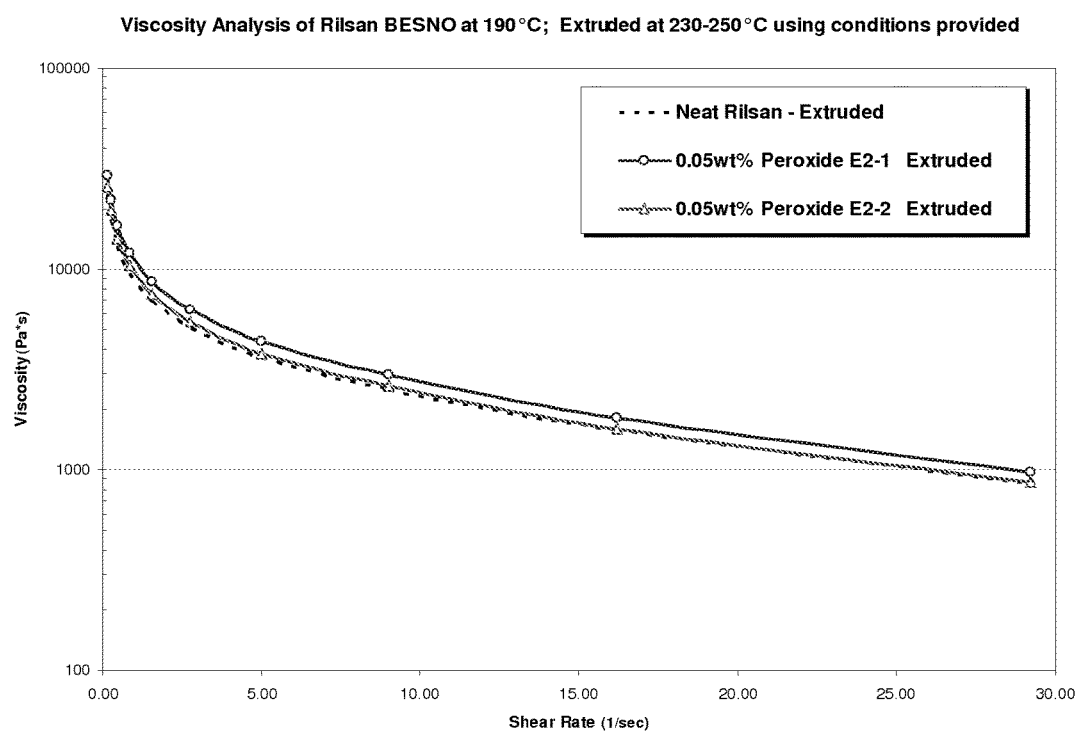
FIG. 6 is a graph of viscosity vs. shear rate of polyamide 11 at 190° C. after modification of the polyamide in a twin screw extruder as described in Example 2.

FIG. 6 shows that there is little change in the polymer melt viscosity after the extrusion modification process. The resulting extrudate was smooth and identical in appearance to the unmodified polymer.

Example 3

Figure 7:
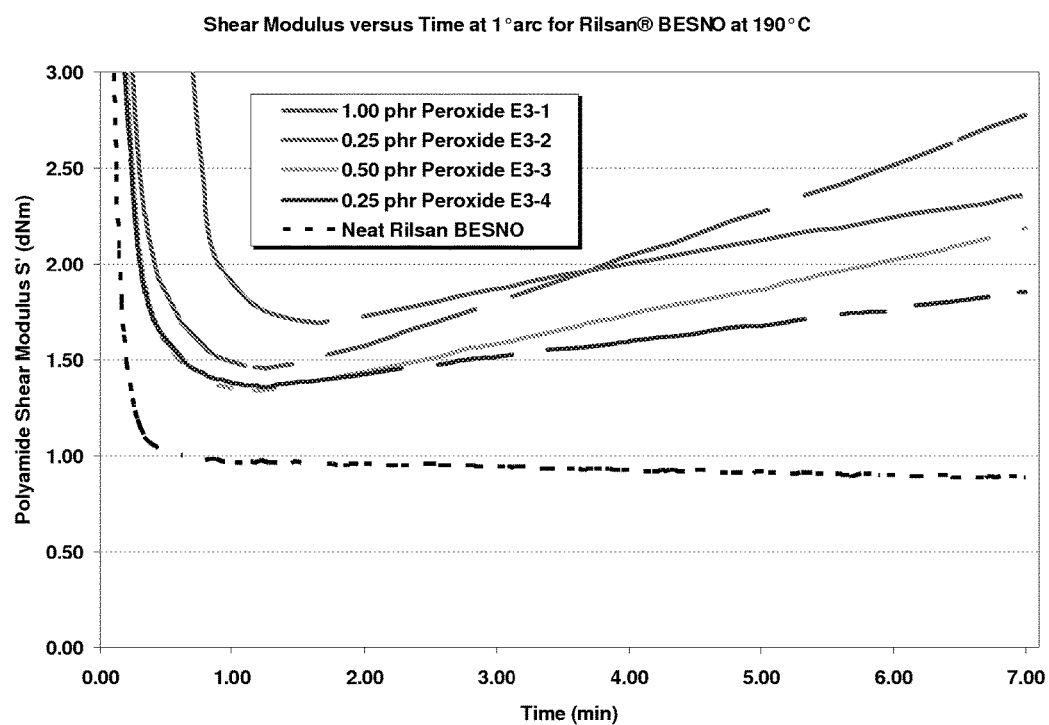
FIG. 7 is a graph of shear modulus vs. time as described in Example 3. Shear modulus of the modified polyamides was determined at 190° C. at a 1° arc of strain and a frequency of 100 cycles/minute using an Alpha Technologies RPA instrument.

In this example several different peroxides were reacted in Rilsan® BESNO polyamide 11 at 190° C. in sufficient time to fully decompose all the peroxide, wherein the peroxide formulations were used at a concentration to achieve a doubling of the Elastic Shear Modulus G' dN-m shear modulus from 1 dN-m for the unmodified polyamide to approximately 2 dN-m or greater. The newly modified PA-11 was then subjected to dynamic mechanical analysis to determine Viscosity in Pascal-seconds vs shear rate in (1/seconds). FIG. 7 shows slightly increased viscosity for all modified resins versus unmodified "Rilsan".

Peroxide E3-1 was used at 1 phr, Peroxide E3-2 was used at 0.25 phr, Peroxide E3-3 was used at 0.50 phr and Peroxide E3-4 was used at 0.25 phr. Further information regarding the various organic peroxides used in this example are provided below.

Peroxide E3-1

Polyether poly-tertiary-butylperoxy carbonate 50% in Ethylbenzene

Peroxide E3-2

OO-tertiary-butylperoxy-O-2-ethylhexylmonoperoxycarbonate □ 95%

Peroxide E3-3

2,5-dimethyl-2,5-di(tertiary-butylperoxy)hexane □ 95%

Peroxide E3-4 m/p-di(tertiary-butylperoxy)diisopropyl benzene at >97% assay

A plot of polyamide shear modulus at 190° C. is provided in FIG. 7. Peroxides E3-1 and E3-2 belong to the family of peroxyesters and specifically the class of monperoxycarbonates. These peroxides have a lower half-life temperature and thus react faster than Peroxides E3-3 and E3-4 which belong to the more thermally stable dialkyl class of peroxides. This example shows that by proper selection and use of these organic peroxides it is possible to significantly increase the polyamide shear modulus, and thus an increase in the polymer melt strength, the polymer molecular weight and the Young's Modulus or tensile strength.

In FIG. 7, the shear modulus of the modified polyamides were determined at 190° C. at a 1° arc of strain and a frequency of 100 cycles/minute using an Alpha Technologies RPA instrument. The peroxides in this figure significantly improved (increased) the shear modulus of the polyamide compared to Neat Rilsan® BESNO which was not reacted with any organic peroxide. In summary, all of these peroxides provided a doubling or more of the Neat Rilsan® BESNO shear modulus. In the case of Peroxide E3-1, the modulus was nearly tripled.

Figure 8:
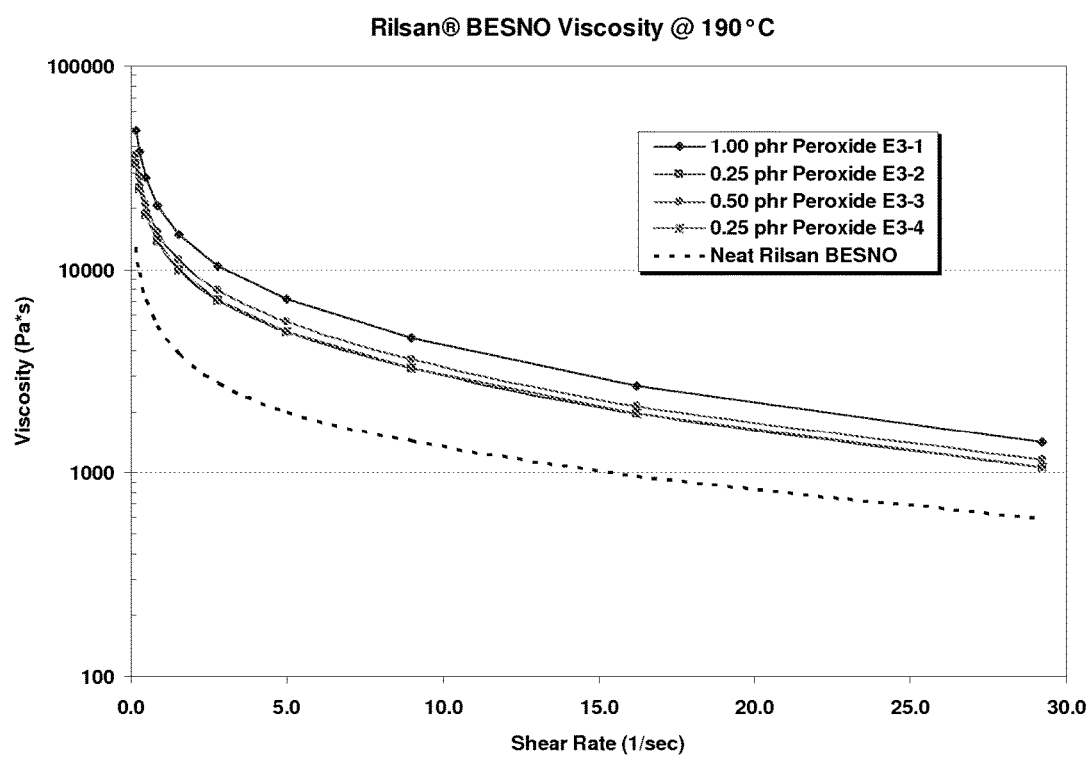
FIG. 8 is a graph of viscosity vs. shear rate as described in Example 3.

FIG. 8 shows the effect of higher polyamide viscosity (due to higher polyamide molecular weight) when using the various peroxides identified as Peroxides E3 (1 to 4) at the indicated concentrations versus the Neat Rilsan® BESNO curve that was not reacted with organic peroxides.

Example 4

To prepare samples for extrusion, Rilsan® BESNO (PA 11) pellets were placed in a glass jar to which Peroxide E4-1 was weighed into the glass jar at the concentrations of 0.00 wt %, 0.125 wt %, and 0.250 wt %. The glass jar was sealed with an aluminum foil lined lid and was shaken to uniformly distribute the organic peroxide. The organic peroxide coated Rilsan® BESNO pellets were allowed to sit for at least 24 hours, prior to extrusion.

Peroxide E4-1

| | |
|---|---|
| Tertiary-butylcumylperoxide >95% assay | 37.4 wt % |
| Triallyl cyanurate | 60.0 wt % |
| Mono-tertiary butyl hydroquinone | 2.6 wt % |

The polymer samples were extruded using a 16 mm co-rotating parallel twin screw extruder as per conditions in TABLE IV. The extruder and die temperatures were the same for each material. Referring to Table IV, as the level of organic peroxide was increased the extruder torque also increased demonstrating that a reaction between the polyamide polymer and the organic peroxide occurred, resulting in higher molecular weight, particularly the Mz which is indicative of increased molecular weight. See Example 5.

TABLE IV

| | Rilsan ® BESNO 0.00 wt % Peroxide E4-1 | Rilsan ® BESNO 0.125 wt % Peroxide E4-1 | Rilsan ® BESNO 0.250 wt % Peroxide E4-1 |
|---|---|---|---|
| Screw speed (rpm) | 18 | 18 | 18 |
| Zone 1 (° C.) | 240 | 240 | 240 |
| Zone 2 (° C.) | 245 | 245 | 245 |
| Zone 3 (° C.) | 245 | 245 | 245 |
| Zone 4 (° C.) | 250 | 250 | 250 |
| Zone 5 (° C.) | 250 | 250 | 250 |
| Zone 6 (° C.) | 250 | 250 | 250 |
| Zone 7 (° C.) | 245 | 245 | 245 |
| Zone 8 (° C.) | 245 | 245 | 245 |
| Zone 9 (° C.) | 240 | 240 | 240 |
| Die (° C.) | 230 | 230 | 230 |
| Feed Rate (lbs/hr) | 0.7 | 0.7 | 0.7 |
| Torque % Range | 37-53 | 46-61 | 56-72 |
| Extruded Sample # | Tab-IV-A | Tab-IV-B | Tab-IV-C |

Example 5

Molecular Weight Analysis of Extruded Rilsan® BESNO with and without E4-1 Peroxide Two extruded polymer samples from EXAMPLE 4 (TABLE IV) were submitted for molecular weight analysis by GPC (gel permeation chromatography), also called SEC (size exclusion chromatography). The Experimental procedure is provided below. The Rilsan® polyamide samples submitted were Tab-IV-A and Tab-IV-B.

Referring to TABLE V, extruded polyamide sample Tab-IV-B made in EXAMPLE 4 which was modified by the peroxide formulation Peroxide E4-1 provides both a higher Mw/Mn and a higher Z average Molecular weight or Mz value compared to the extruded polyamide sample Tab-IV-A made without peroxide modification.

The SEC (Size Exclusion Chromatograph) analysis was performed with the following chromatographic instruments: Waters Alliance 2695 with Waters Differential Refractometer 2410. Empower 3 was used for the acquisition, processing, and reporting of the data. A set of two PL Gel mixed B columns with bead size of 10 microns were used at the operating temperature of 35° C. The eluent was DCM:DCAA 4:1 v/v (DCM=dichloromethane, DCAA=dichloroacetic acid) with a flow rate of 1 ml/min. The samples were dissolved in eluent at a concentration of 2.5 mg/ml at 70° C. for about 1. hour. All samples were fully soluble. Each sample was filtered through a 0.45 micron filter. Calibration was achieved using a set of nine polystyrene standards, correlating log (MW) with elution time, using the DCM:DCAA eluent. The calibration curve is represented by a cubic polynomial with R2 of at least 0.999 for 9 polystyrene standards with MW ranging from 580 to 7,500,000 g/mole.

TABLE V

| Extruded Polymer Sample # EXAMPLE 4; TABLE IV | Mw/Mn | Mz (g/mole) |
|---|---|---|
| Tab-IV-A | 2.2 | 155,400 |
| Tab-IV-B | 2.3 | 169,300 |

Example 6

Pebax® 4533 was reacted at 200° C. with Luperox® F at 0.1 phr and 0.2 phr of SR-350 from Sartomer; and Luperox® F at 0.1 phr and 0.2 phr of TAC (triallyl cyanurate) and then tested on a rheometer to study the changes in G' (elastic modulus) in [Pa], Tangent Delta which is G"/G' or Loss Modulus/Elastic Modulus and eta* the complex viscosity in [Pa·s] at 200° C.

Table VI shows the rheological data when studying Pebax® 4533 which was not modified and serves as the comparative/control. Table VII is Pebax® 4533 reacted at 200° C. with Luperox® F used at 0.1 phr and 0.2 phr of SR-350 from Sartomer. Table VIII is Pebax® 4533 reacted at 200° C. with Luperox® F used at 0.1 phr and 0.2 phr of TAC (triallyl cyanurate).

Unexpectedly, in Tables VII and VIII, it was found that the G' (elastic modulus) steadily increased when reacted with 0.1 phr Luperox® F and 0.2 phr of a coagent (either SR-350 or TAC), wherein TAC provided a greater increase in G' measured in [Pa] versus the unmodified control data in Table VI. This shows that for each frequency tested the use of the peroxide and coagent blend increases the elastic modulus or strength of the Pebax® 4533 as G' is directly proportional to the polymer's tensile modulus or Young's modulus, compared to the unreacted or modified control in Table VI. Thus modification of the Pebax® with organic peroxides and coagents increases the polymer physical properties.

Furthermore the tangent delta decreases with the use of Luperox® F and either coagent (SR-350 or TAC), compared to the unmodified control in Table VI which again shows improved properties in terms of better creep resistance.

TABLE VI

Rheology of Pebax® 4533 at 200° C.

| | Angular Frequency | | | |
|---|---|---|---|---|
| [rad/s] | G' - 4533 [Pa] | G" - 4533 [Pa] | tan_delta | eta* - 4533 [Pa · s] |
| 29.2 | 2030 | 12700 | 6.24 | 441 |
| 13.5 | 632 | 6220 | 9.85 | 462 |
| 6.28 | 183 | 2970 | 16.3 | 474 |
| 2.92 | 49.9 | 1400 | 28.1 | 481 |
| 1.35 | 13.5 | 655 | 48.7 | 484 |
| 0.628 | 3.72 | 305 | 81.9 | 485 |
| 0.292 | 1.35 | 141 | 105 | 485 |
| 0.135 | 0.548 | 65.5 | 119 | 484 |
| 0.0628 | 0.218 | 30.3 | 139 | 482 |

TABLE VII

Rheology of Pebax® 4533 which was reacted with 0.1 phr Luperox F plus 0.2 phr SR-350 at 200° C.

| | Angular Frequency | | | |
|---|---|---|---|---|
| [rad/s] | G' - 4533 + F-SR350 [Pa] | G" - 4533 + F-SR350 [Pa] | tan_delta | eta* - 4533 + F-SR350 [Pa · s] |
| 29.2 | 4400 | 13200 | 3.01 | 478 |
| 13.5 | 1880 | 7170 | 3.82 | 548 |
| 6.28 | 735 | 3730 | 5.08 | 606 |
| 2.92 | 259 | 1870 | 7.2 | 647 |
| 1.35 | 82 | 906 | 11.1 | 672 |
| 0.628 | 24.5 | 428 | 17.5 | 683 |
| 0.292 | 7.19 | 197 | 27.4 | 676 |
| 0.135 | 2.29 | 89.9 | 39.2 | 664 |
| 0.0628 | 0.673 | 40.7 | 60.5 | 648 |

TABLE VIII

Rheology of Pebax® 4533 which was reacted with 0.1 phr Luperox F plus 0.2 phr TAC at 200° C.

| | Angular Frequency | | | |
|---|---|---|---|---|
| [rad/s] | G' - 4533 + F-TAC [Pa] | G" - 4533 + F-TAC [Pa] | tan_delta | eta* - 4533 + F-TAC [Pa · s] |
| 29.2 | 6180 | 14400 | 2.33 | 538 |
| 13.5 | 2920 | 8210 | 2.81 | 644 |
| 6.28 | 1290 | 4510 | 3.5 | 747 |
| 2.92 | 528 | 2390 | 4.52 | 838 |
| 1.35 | 197 | 1220 | 6.18 | 911 |
| 0.628 | 66.3 | 599 | 9.04 | 959 |
| 0.292 | 20.8 | 285 | 13.7 | 978 |
| 0.135 | 5.81 | 133 | 22.8 | 981 |
| 0.0628 | 1.64 | 61.2 | 37.4 | 974 |

I claim:
1. A curable composition comprising at least one polyamide selected from the group consisting of PA 6, PA 11, PA12, PA 66, PA610, PA612, PA1010, PA1012, polyether block polyamides, and copolymers thereof, at least one organic peroxide, and optionally (i) a coagent compound which is not an organic peroxide, contains one or more sites of unsaturation per molecule capable of participating in a free radical reaction, and which is selected from the group consisting of acrylic, methacrylic, allylic, vinyl, norbornene, bismaleimide, polybutadiene, and aromatic coagents and/or (ii) a free radical trap different from said coagent and said organic peroxide, said free radical trap selected from the group consisting of nitroxide free radicals, hydroquinone and quinone free radicals, TEMPO free radicals and their derivatives, PROXYL free radicals and their derivatives, and hindered phenol antioxidants, said curable composition being substantially free of peroxide reactable polyolefin and/or rubber.

2. The composition of claim 1 where the at least one polyamide is a homopolymer, copolymer or mixture of homopolymer and copolymer and where the at least one polyamide is crystalline or amorphous, or a mixture of crystalline and amorphous polyamide.

3. The composition of claim 1 where the peroxide is selected from the group consisting of diacyl peroxides, peroxydicarbonate, endo peroxides, dialkyl peroxides, peroxyketal, peroxyester, monoperoxycarbonate, trioxepane peroxide, t-butylcumyl peroxide, 2,5-dimethyl-2,5-di(t-butylperoxy)hexane, m/p-di(t-butylperoxy)diisopropylbenzene, di-t-butylperoxide, 2,5-dimethyl-2,5-di(t-butylperoxy) hexyne-3, dicumyl peroxide, t-butylperoxybenzoate, 1,1-di (t-butylperoxy)-3,3,5-trimethyl cyclohexane, 1,1-di(t-butylperoxy) cyclohexane, n-butyl-4,4-di(t-butylperoxy) valerate, ethyl 3,3-di(t-butylperoxy)butyrate, t-butyl peroxyacetate, OO-t-butyl-O-2-ethylhexyl monoperoxycarbonate, OO-t-butyl-O-isopropyl monoperoxycarbonate, polyether polyt-butylperoxycarbonate, 3,3,5,7,7-pentamethyl-1,2,4-trioxepane, and 3,6,9-triethyl-3,6,9-trimethyl-1, 4,7-triperoxonane.

4. The composition of claim 1 where the coagent is selected from the group consisting of allylic and aromatic coagents.

5. The composition of claim 1 where the free radical trap is selected from the group consisting of hydroquinones and nitroxide free radicals.

6. The composition of claim 1 where the polyamide is at least one polyamide selected from the group consisting of PA 11, PA12, PA610, PA612, PA1010 and PA1012; the peroxide is at least one peroxide selected from the group consisting of dialkyl peroxides, peroxyester, peroxyketal and monoperoxycarbonate peroxides; the coagent is at least one coagent selected from the group consisting of triallyl cyanurate, triallyl isocyanurate, diallylphthalate, diallyl esters of dibasic acids, trimethylolpropane trimethacrylate, trimethylolpropane triacrylate, zinc diacrylate, zinc dimethacrylate, N,N'-m-phenylene bismaleimide and alpha methylstyrene dimer; and the free radical trap is at least one free radical trap selected from the group consisting of mono-tert-butyl-hydroquinone, hydroquinone monomethyl ether, and 4-hydroxyTempo.

7. The composition of claim 1 where the polyamide is selected from the group consisting of PA 11, PA12, PA610, PA612, PA1010 and PA1012; the peroxide is selected from the group consisting of di-t-butyl peroxide, t-butylcumyl peroxide, 2,5-dimethyl-2,5-di(t-butylperoxy)hexane and m/p-di(t-butylperoxy)diisopropylbenzene; the coagent is selected from the group consisting of triallyl cyanurate and triallyl isocyanurate; and the free radical trap is selected from the group consisting of mono-tertiary butyl hydroquinone, hydroquinone monomethyl ether, TEMPO and 4-hydroxyTEMPO.

8. The composition of claim 1 which is thermoplastic.

9. The composition of claim 1 which is thermoset.

10. A method for providing improved polyamides comprising the steps of (1) providing a first polyamide having an initial molecular weight, (2) contacting said first polyamide with at least one organic peroxide under conditions sufficient to provide a second polyamide having increased molecular weight and substantially the same viscosity versus shear rate as that of the first polyamide;

wherein said contacting step takes place in the presence of (i) a coagent which is not an organic peroxide, contains one or more sites of unsaturation per molecule capable of participating in a free radical reaction, and which is selected from the group consisting of acrylic, methacrylic, allylic, vinyl, norbornene, bismaleimide, polybutadiene, and aromatic coagents and/or (ii) a free radical trap different from said coagent and said organic peroxide, said free radical trap selected from the group consisting of nitroxide free radicals, hydroquinone and quinone free radicals, TEMPO free radicals and their derivatives, PROXYL free radicals and their derivatives, and hindered phenol antioxidants;

and wherein said contacting step takes place in the absence of peroxide-reactable polyolefin and/or rubber.

11. The method of claim 10, wherein said first polyamide is not dried prior to contact with said organic peroxide.

12. The method of claim 10 wherein the second polyamide has higher impact strength, increased tensile strength, and/or increased creep resistance than said first polyamide, and substantially the same viscosity versus shear rate.

13. The method of claim 10 wherein the improved polyamide is thermoplastic.

14. A polyamide article manufactured according to the method of claim 10.

15. A method for providing improved polyamides comprising the steps of, (1) providing a first polyamide having an initial molecular weight, (2) contacting said first polyamide with at least one organic peroxide under conditions sufficient to provide a second polyamide having increased molecular weight and increased viscosity versus shear rate as that of the first polyamide, such that said increased viscosity is not high enough to prevent polymer flow during processing;

wherein said contacting step takes place in the presence of (i) a coagent which is not an organic peroxide, contains one or more sites of unsaturation per molecule capable of participating in a free radical reaction, and Which is selected from the group consisting of acrylic, methacrylic, allylic, vinyl, norbornene, bismaleimide, polybutadiene, and aromatic coagents and/or (ii) a free radical trap different from said coagent and said organic peroxide, said free radical trap selected from the group consisting of nitroxide free radicals, hydroquinone and quinone free radicals, TEMPO free radicals and their derivatives, PROXYL free radicals and their derivatives, and hindered phenol antioxidants;

and wherein said contacting step takes place in the absence of peroxide-reactable polyolefin and/or rubber.

16. The method of claim 15, wherein said first polyamide is not dried prior to contact with said organic peroxide.

17. The method of claim 15 wherein the second polyamide has higher impact strength, increased tensile strength, and/or increased creep resistance than said first polyamide.

18. The method of claim 15 wherein the improved polyamide is thermoplastic.

19. A polyamide article manufactured according to the method of claim 15.

20. A method for manufacturing a polyamide article, the method comprising the steps of, (1) providing at least one polyamide selected from the group consisting of PA 6, PA 11, PA12, PA 66, PA612, PA1010, PA1012, polyether block polyamides, and copolymers thereof, and at least one organic, peroxide, and/or a pre-blend of said at least one polyamide and said at least one organic peroxide, and optionally (i) a coagent compound which is not an organic peroxide, contains one or more sites of unsaturation per molecule capable of participating in a free radical reaction, and which is selected from the group consisting of acrylic, methacrylic, allylic, vinyl, norbornene, bismaleimide, polybutadiene, and aromatic coagents and/or (ii) a free radical trap different from said coagent and different from said organic peroxide, said free radical trap selected from the group consisting of nitroxide free radicals, hydroquinone and quinone free radicals, TEMPO free radicals and their derivatives, PROXYL free radicals and their derivatives, and hindered phenol antioxidants, (2) applying heat to form a mixture of molten polyamide and at least one organic peroxide that is substantially free of peroxide reactable polyolefin and/or rubber, and (3) molding the molten polyamide mixture, wherein molding is performed by a process selected from the group consisting of extrusion, injection molding, compression molding, transfer molding, and rotational molding, thereby forming the polyamide article, said article being substantially peroxide free.

21. A polyamide article manufactured according to the method of claim 20.

* * * * *